(12) United States Patent
Yeh et al.

(10) Patent No.: US 12,155,738 B2
(45) Date of Patent: *Nov. 26, 2024

(54) SYSTEM AND METHOD FOR JOINT DYNAMIC FORWARDING AND CACHING IN CONTENT DISTRIBUTION NETWORKS

(71) Applicants: Northeastern University, Boston, MA (US); California Institute of Technology, Pasadena, CA (US)

(72) Inventors: Edmund Meng Yeh, Newton, MA (US); Ying Cui, Shaanxi (CN); Ran Liu, Heilongjiang (CN); Tracey Ho, Pasadena, CA (US); Michael Burd, Lees Summit, MO (US); Derek Leong, Singapore (SG)

(73) Assignees: Northeastern University, Boston, MA (US); California Institute of Technology, Pasadena, CA (US)

( * ) Notice: Subject to any disclaimer, the term of this patent is extended or adjusted under 35 U.S.C. 154(b) by 942 days.

This patent is subject to a terminal disclaimer.

(21) Appl. No.: 16/683,931

(22) Filed: Nov. 14, 2019

(65) Prior Publication Data

US 2020/0162574 A1 May 21, 2020

Related U.S. Application Data

(62) Division of application No. 15/022,251, filed as application No. PCT/US2014/058396 on Sep. 30, 2014, now Pat. No. 10,523,777.

(Continued)

(51) Int. Cl.
*H04L 45/586* (2022.01)
*H04L 45/64* (2022.01)
(Continued)

(52) U.S. Cl.
CPC .......... *H04L 67/568* (2022.05); *H04L 45/586* (2013.01); *H04L 45/64* (2013.01); *H04L 47/27* (2013.01); *H04L 45/02* (2013.01)

(58) Field of Classification Search
CPC ....... H04L 67/56; H04L 45/586; H04L 45/64; H04L 47/27
(Continued)

(56) References Cited

U.S. PATENT DOCUMENTS 5,875,464 A 2/1999 Kirk
6,772,193 B1 * 8/2004 Igawa ................ G06F 16/9574
709/219

(Continued)

FOREIGN PATENT DOCUMENTS

CN 106686060 A 5/2017
EP 3053055 A2 10/2016
(Continued)

OTHER PUBLICATIONS

Avrachenkov et al. Congestion control of TCP flows in Internet routers by means of index policy. Computer Networks. (date unavailable).
(Continued)

*Primary Examiner* — Vivek Srivastava
*Assistant Examiner* — Hien V Doan
(74) *Attorney, Agent, or Firm* — Hamilton, Brook, Smith & Reynolds, P.C.

(57) ABSTRACT

A system and method for joint dynamic interest request forwarding and dynamic cache placement and eviction and provided within the context of the Named Data Networking (NDN) architecture. The system and method employ a virtual control plane that operates on the user demand rate for data objects in the network, and an actual plane that handles Interest Packets and Data Packets. Distributed algo-
(Continued)

rithms within the virtual plane achieve network load balancing through dynamic forwarding and caching, thereby maximizing the user demand rate that the NDN network can satisfy. A method of congestion control is also provided to achieve optimal network fairness using the VIP framework.

9 Claims, 19 Drawing Sheets

Related U.S. Application Data

(60) Provisional application No. 62/009,948, filed on Jun. 10, 2014, provisional application No. 61/884,472, filed on Sep. 30, 2013.

(51) Int. Cl.
*H04L 47/27* (2022.01)
*H04L 67/568* (2022.01)
*H04L 45/02* (2022.01)

(58) Field of Classification Search
USPC ............................................ 709/213
See application file for complete search history.

(56) References Cited

U.S. PATENT DOCUMENTS

| | | | |
|---|---|---|---|
| 7,395,348 B1 | 7/2008 | Cieslak et al. | |
| 7,516,198 B1 | 4/2009 | Appala et al. | |
| 7,680,875 B1* | 3/2010 | Shopiro | G06F 16/972 709/200 |
| 7,725,598 B2 | 5/2010 | Cieslak et al. | |
| 8,204,060 B2 | 6/2012 | Jacobson et al. | |
| 8,386,622 B2 | 2/2013 | Jacobson | |
| 8,762,570 B2 | 6/2014 | Qian et al. | |
| 9,065,809 B2 | 6/2015 | Kling et al. | |
| 9,559,889 B1 | 1/2017 | Vincent et al. | |
| 10,291,748 B1 | 5/2019 | Dods | |
| 10,523,777 B2 | 12/2019 | Yeh et al. | |
| 10,530,893 B2 | 1/2020 | Rossi et al. | |
| 11,258,879 B2 | 2/2022 | Ioannidis et al. | |
| 11,336,473 B2 | 5/2022 | Yeh et al. | |
| 11,349,948 B2 | 5/2022 | Mahdian et al. | |
| 11,677,625 B2 | 6/2023 | Yeh et al. | |
| 11,926,463 B2 | 3/2024 | Clapp et al. | |
| 11,962,463 B2 | 4/2024 | Yeh et al. | |
| 2003/0215006 A1 | 11/2003 | Raghothaman | |
| 2004/0034746 A1 | 2/2004 | Horn et al. | |
| 2004/0215805 A1* | 10/2004 | Tan | H04L 67/61 709/231 |
| 2004/0258088 A1* | 12/2004 | Clark | H04L 12/43 370/465 |
| 2007/0268816 A1 | 11/2007 | Hosein | |
| 2008/0091840 A1 | 4/2008 | Guo et al. | |
| 2008/0222305 A1 | 9/2008 | Cieslak et al. | |
| 2009/0043729 A1 | 2/2009 | Liu et al. | |
| 2009/0287835 A1* | 11/2009 | Jacobson | H04L 67/1065 709/229 |
| 2010/0057908 A1 | 3/2010 | Smith | |
| 2010/0095012 A1 | 4/2010 | Zuckerman et al. | |
| 2011/0122878 A1 | 5/2011 | Li et al. | |
| 2012/0072526 A1* | 3/2012 | Kling | G06F 12/0871 709/213 |
| 2012/0158912 A1 | 6/2012 | Jacobson | |
| 2012/0209942 A1* | 8/2012 | Zehavi | H04L 67/63 709/213 |
| 2012/0317307 A1 | 12/2012 | Ravindran | |
| 2013/0013726 A1 | 1/2013 | Westberg et al. | |
| 2013/0018937 A1 | 1/2013 | Kim et al. | |
| 2013/0179490 A1 | 7/2013 | Naga et al. | |
| 2013/0198351 A1 | 8/2013 | Widjaja et al. | |
| 2013/0235880 A1 | 9/2013 | Goldman | |
| 2013/0268733 A1 | 10/2013 | Narayanan et al. | |
| 2014/0164552 A1 | 6/2014 | Kim et al. | |
| 2014/0172981 A1 | 6/2014 | Kim et al. | |
| 2014/0173034 A1 | 6/2014 | Liu et al. | |
| 2015/0350078 A1 | 12/2015 | Azgin et al. | |
| 2016/0014027 A1 | 1/2016 | Oran et al. | |
| 2016/0043940 A1 | 2/2016 | Mahadevan et al. | |
| 2016/0065689 A1 | 3/2016 | Satoshi | |
| 2016/0149810 A1 | 5/2016 | Liu | |
| 2016/0234333 A1 | 8/2016 | Yeh et al. | |
| 2016/0255169 A1 | 9/2016 | Kovvuri et al. | |
| 2017/0041421 A1 | 2/2017 | Liu | |
| 2019/0339688 A1 | 11/2019 | Cella et al. | |
| 2020/0137192 A1 | 4/2020 | Ioannidis et al. | |
| 2020/0328905 A1 | 10/2020 | Yeh et al. | |
| 2020/0412836 A1 | 12/2020 | Arrobo et al. | |
| 2021/0006459 A1 | 1/2021 | Yeh et al. | |
| 2021/0112135 A1 | 4/2021 | Mahdian et al. | |
| 2023/0254206 A1 | 8/2023 | Yeh et al. | |
| 2024/0205083 A1 | 6/2024 | Yeh et al. | |

FOREIGN PATENT DOCUMENTS

| | | |
|---|---|---|
| WO | 2015048773 A2 | 4/2015 |
| WO | 2015/161737 A1 | 10/2015 |
| WO | 2018/236723 A1 | 12/2018 |
| WO | 2019/075363 A1 | 4/2019 |

OTHER PUBLICATIONS

RouteFlow Project. web.archive.org/web/20131110183952/https://sites.google.com/site/routeflow/, accessed Nov. 10, 2013.

L. Zhang D. Estrin, J. Burke, V. Jacobson, J. Thornton, D. K. Smetters, B. Zhang, G. Tsudik, kc claffy, D. Krioukov, D. Massey, C. Papadopoulos, T. Abdelzaher, L. Wang, P. Crowley, and E. Yeh, Named data networking (ndn) project. Technical Report NDN-0001, Oct. 2010.

S. Eum K. Nakauchi, M. Murata, Y. Shoji, and N. Nishinaga. Catt: Potential based routing with content caching for icn. In Proceedings of SIGCOMM 2012 ICN, pp. 49-54, Helsinki, Finland, Aug. 2012.

M. Amble P. Parag, S. Shakkottai, and L. Ying. Content-aware caching and traffic management in content distribution networks. In Proceedings of IEEE Infocom 2011, pp. 2858-2866, Shanghai, China, Apr. 2011.

H. Xie G. Shi, and P. Wang. Tecc: Towards collaborative in-network caching guided by traffic engineering. In Proceedings of IEEE Infocom 2012:Mini-Conference, pp. 2546-2550, Orlando, Florida, USA, Mar. 2012.

L. Tassiulas and A. Ephremides. Stability properties of constrained queueing systems and scheduling for maximum throughput in multihop radio networks. IEEE Trans. Autom. Control, 37(12): 1936-1949, Dec. 1992.

N. Laoutaris, S. Syntila, and I. Stavrakakis. Meta algorithms for hierarchical web caches. In Performance, Computing, and Communications, 2004 IEEE International Conference on, pp. 445-452, 2004.

E. M. Yeh, T. Ho, Y. Cul, M. Hurd, R. Liu, and D. Leong. Vip: A framework for joint dynamic forwarding and caching in named data networks. ICN'14, Sep. 24-26, 2014, Paris, France.

J. Mo and J. Walrand, Fair end-to-end window-based congestion control. IEEE/ACM Trans. Networking, vol. 8, No. 5, pp. 556-567, Oct. 2000.

M.J. Neely, E. Modiano, and C.E. Rohrs. Dynamic power allocation and routing for time varying wireless networks; IEEE J. Sel. Areas Commun., 23(1):89-103, Jan. 2005.

R. M. Loynes. The stability of a queue with non-independent interarrival and service times. Mathematical Proceedings of the Cambridge Philosophical Society, vol. 58, pp. 497-520, 1962.

L. Georgiadis, M. J. Neely, and L. Tassiulas. Resource allocation and cross-layer control in wireless networks. Foundations and Trends in Networking, 1(1)1 : 1-144, 2006.

S. Gitzenis, G. S. Paschos, and L. Tassiulas. Asymptotic laws for content replication and delivery in wireless networks. In Proceedings of IEEE Infocom 2012, pp. 531-539, Orlando, Florida, USA, Mar. 2012.

(56) References Cited

OTHER PUBLICATIONS

V. Jacobson, D. K. Smetters, J. D. Thornton, M. F. Plass, N. H. Briggs, and R. L. Braynard. Networking named content. In Proceedings of the 5th international conference on Emerging networking experiments and technologies, CoNEXT '09, pp. 1-12, New York, NY, USA, 2009. ACM.
W. Chai, D. He, L. Psaras, and G. Pavlou. Cache "less for more" in information-centric networks. In Proceedings of the 11th International IFIP TC 6 Conference on Networking—vol. Part i, IFIP' 12, pp. 27-40, Berlin, Heidelberg, 2012. Springer-Verlag.
Z. Ming, M. Xu, and D. Wang. Age-based cooperative caching in information-centric networks. In Computer Communications Workshops (Infocom Wkshps), 2012 IEEE Conference on, pp. 268-273, Mar. 2012.
C. Yi, A. Afanasyev, L. Wang, B. Zhang, and L. Zhang. Adaptive forwarding in named data networking. SIGCOMM Comput. Commun. Rev., 42(3):62-67, Jun. 2012.
Zhang et al. Solving 0-1 knapsack problems based on amoeboid organism algorithm. Applied Mathematics and Computation 219 (2013) 9959-9970.
Truong et al. Chemical reaction optimization with greedy strategy for the 0-1 knapsack problem. Applied Soft Computing 13 (2013) 1774-1780.
Bjurefors et al. Interest dissemination in a searchable data-centric opportunistic network. Wireless Conference (EW), 2010 European.
Amendment for European Application No. 14848610.3 filed Oct. 13, 2017 (17 pages).
Communication Under Rule 70(2) and 70a(2) EPC for European Application No. 14848610.3 dated Apr. 4, 2017 (1 page).
Communication Under Rule 71(3) EPC for European Application No. 14848610.3 dated Feb. 23, 2018 (5 pages).
International Search Report for International Application No. PCT/US2014/058396 entitled "System and Method for Joint Dynamic Forwarding and Caching in Content Distribution Networks" mailed Feb. 19, 2015 (4 pages).
International Preliminary Report on Patentability for International Application No. PCT/US2014/058396 entitled "System and Method for Joint Dynamic Forwarding and Caching in Content Distribution Networks" dated Apr. 5, 2016 (41 pages).
Supplemental European Search Report for European Application No. 14848610.3 dated Mar. 8, 2017 (1 page).
Abedini, N. and S. Shakkottai, "Content caching and scheduling in wireless networks with elastic and inelastic traffic," IEEE/ACM Transactions on Networking, 22(3): 864-874 (2014).
Ageev, et al., "Pipage Rounding: A New Method of Constructing Algorithms with Proven Performance Guarantee*," Journal of Combinatorial Optimization, 8, 307-328, 2004.
Albers, S., "Online algorithms: a survey," Mathematical Subject Classification (1991).
Applegate, D., et al., "Optimal content placement for a large-scale VoD system," in IEEE/ACM Transactions on Networking, vol. 24, No. 4, Aug. 2016.
Baev, I., et al., "Approximation algorithms for data placement problems," SIAM Journal on Computing, 38(4): 1411-1429 (2008).
Bartal, Y., et al., "Competitive algorithms for distributed data management," Journal of Computer and System Sciences, 51(3): 341-358 (1995).
Berger, D. S., et al., "Exact analysis of TTL cache networks," IFIP Performance, 2014.
Blaszczyszyn, B. and A. Giovanidis, "Optimal geographic caching in cellular networks," in ICC, 2015.
Borst, S., et al., "Distributed caching algorithms for content distribution networks," in INFOCOM, 2010.
Calinescu, G., et al., "Maximizing a submodular set function subject to a matroid constraint," in Integer programming and combinatorial optimization, Springer, 2007, pp. 182-196.
Carofiglio, G., et al., "Joint forwarding and caching with latency awareness in information-centric networking," Computer Networks, 110:133-153 (2016).

Che, H., et al., "Hierarchical web caching systems: Modeling, design and experimental results," Selected Areas in Communications, 20(7): 1305-1314 (2002).
Chiocchetti, R., et al., "Exploit the known or explore the unknown?" in ICN, (2012).
Cohen, E. and S. Shenker, "Replication strategies in unstructured peer-to-peer networks," in SIGCOMM, 2002.
Cormen, T., et al., Introduction to Algorithms, MIT Press, 2009.
Dehghan, M., et al., "A utility optimization approach to network cache design," in INFOCOM, 2016.
Dehghan, M., et al., "On the complexity of optimal routing and content caching in heterogeneous networks," in INFOCOM, 2014.
Edmonds, J., "Submodular functions, matroids, and certain polyhedra," Edited by G. Goos, J. Hartmanis, and J. van Leeuwen, vol. 11 (1970).
Eppstein, D., "Finding the k shortest paths," 26 pages, Mar. 31, 1997.
Fayazbakhsh, S. K., et al., "Less pain, most of the gain: Incrementally deployable icn," in ACM Sigcomm Computer Communication Review, vol. 43, No. 4, ACM, 2013, pp. 147-158.
Feng, H., "Optimal Dynamic Cloud Network Control," in IEEE/ACM Transactions on Networking, vol. 26, No. 5, pp. 2118-2131 (Oct. 2018).
Fleischer, L., et al., "Tight approximation algorithms for maximum general assignment problems," in SODA, 2006.
Fofack, N. C., et al., "Analysis of TTL-based cache networks," in Valuetools, 2012.
Fricker, C., et al., "A versatile and accurate approximation for LRU cache performance," in ITC, 2012.
Goemans, M. X. and D. P. Williamson, "New 3/4-approximation algorithms for the maximum satisfiability problem," SIAM Journal on Discrete Mathematics, 7(4): 656-666 (1994).
He, J. and J. Rexford, "Toward internet-wide multipath routing," IEEE network, 22(2) (2008).
Hopps, C. E., "Analysis of an equal-cost multi-path algorithm," 2000, iETF RFC2992.
Invitation to Pay Additional Fees received for PCT Patent Application No. PCT/US2014/058396, mailed on Dec. 11, 2014, 3 pages.
Ioannidis, et al., "Jointly optimal routing and caching for arbitrary network topologies," in ACM ICN, 2017.
Ioannidis, S. and P. Marbach, "Absence of evidence as evidence of absence: A simple mechanism for scalable p2p search," in ITechnical Report, University of Toronto, Aug. 29, 2008.
Jacobson, V., et al., "Networking named content," in CoNEXT, 2009.
Jiang, W., et al., "Orchestrating massively distributed cdns," in CoNEXT, 2012.
Jonathan, A. et al.,"Locality-Aware Load Sharing in Mobile Cloud Computing,", Proceedings of the 10th International conference on Utility and Cloud Computing, (Dec. 5, 2017), pp. 141-150.
Krause, A. and D. Golovin, "Submodular function maximization," 28 pages, 2012.
Kurose, J. F. and K. W. Ross, Computer Networking: a Top-Down Approach, Addison Wesley, 2007.
Laoutaris, N., et al., "Meta algorithms for hierarchical web caches," in ICPCC, 2004.
Laoutaris, N., et al., "The LCD interconnection of LRU caches and its analysis," 33 pages (2006).
Marina, M. K. and S. R. Das, "On-demand multipath distance vector routing in ad hoc networks," in Network Protocols, 2001. Ninth International Conference on IEEE, 2001, p. 14 23.
Martina, V., et al., "A unified approach to the performance analysis of caching systems," in Infocom, 2014.
Michelot, C., "A finite algorithm for finding the projection of a point onto the canonical simplex of R?n," Journal of Optimization Theory and Applications, 50(1): 195-200 (1986).
Naveen, K., et al., "On the interaction between content caching and request assignment in cellular cache networks," in ATC, 2015.
Nemhauser, G. L. and L. A. Wolsey, "Best algorithms for approximating the maximum of a submodular set function," Mathematics of operations research, 3(3): 177-188 (1978).

(56) References Cited

OTHER PUBLICATIONS

Nemhauser, G. L., et al., "An analysis of approximations for maximizing submodular set functions—i," Mathematical Programming, 14(1): 265-294 (Dec. 1978).

Nemirovski, A., Efficient methods in convex programming, Fall semester 1994/1995.

Nitzberg, B. and V. Lo, "Distributed shared memory: A survey of issues and algorithms," Computer, 24(8): 52-60 (1991).

Papadimitriou, C. H. and K. Steiglitz, Combinatorial optimization: algorithms and complexity, Courier Corporation, 1982.

Podlipnig, S. and L. Boszormenyi, "A survey of web cache replacement strategies," ACM Computing Surveys (CSUR), 35(4): 374-398 (2003).

Poularakis, et al., "Approximation Caching and Routing Algorithms for Massive Mobile Data Delivery," Globecom 2013—Wireless Communications Symposium.

Psaras, I., et al., "Probabilistic in-network caching for information-centric networks," in ICN (2012).

Rosensweig, E. J., et al., "Approximate models for general cache networks," in Infocom IEEE, 2010, pp. 1-9.

Rosensweig, E. J., et al., "On the steady-state of cache networks," in Infocom, 2013.

Rossi, D. and G. Rossini, "Caching performance of content centric networks under multi-path routing (and more)," Telecom ParisTech, Tech. Rep., 2011.

Rossini, G. and D. Rossi, "Coupling caching and forwarding: Benefits, analysis, and implementation," in Proceedings of the 1st international conference on Information-centric networking ACM, 2014, pp. 127-136.

Shanmugam, K., et al., "Femtocaching: Wireless content delivery through distributed caching helpers," Transactions on Information Theory, 59(12): 8402-8413 (2013).

Vondrák, J., "Optimal approximation for the submodular welfare problem in the value oracle model," in STOC, 2008.

Vutukury, S. and J. J. Garcia-Luna-Aceves, "Mdva: A distance-vector multipath routing protocol," in Infocom 2001. Twentieth Annual Joint Conference of the IEEE Computer and Communications Societies. Proceedings. IEEE, vol. 1, 2001, pp. 557-564.

Wang J. et al, "An optimal Cache management framework for information-centric networks with network coding, "2014 IFIP Networking Conference, IFIP, Jun. 2, 2014, pp. 1-9.

Wang, Y., et al., "Optimal cache allocation for content-centric networking," in 2013 21st IEEE International Conference on Network Protocols (ICNP). IEEE, 2013, pp. 1-10.

Xie, et al., "TECC: Towards Collaborative In-network Caching Guided by Traffic Engineering," The 31st Annual IEEE International Conference on Computer Communications: Mini-Conference, 2012.

Yang, C.-S. et al., "Communication-Aware Scheduling of Serial Tasks for Dispersed Computing," in IEEE/ACM Transactions on Networking, vol. 27, No. 4, pp. 1330-1343 (Aug. 2019).

Yeh, E. et al., VIP: A Framework for Joint Dynamic Forwarding and Caching in Named Data Networks, ACM-ICN '14: Proceedings of the 1st ACM Conference on Information-Centric Networking, pp. 117-126 (Sep. 2014).

Yen, J. Y., "Finding the k shortest loopless paths in a network," management Science, 17(11): 712-716 (1971).

Zhang, et al., "Service-centric traffic engineering and cache orchestration in an ICN-enabled network," IEEE CCNC Conference, 2014.

Zhang, J. et al., "Optimal Control of Distributed Computing Networks with Mixed-Cast Traffic Flows," IEEE Infocom 2018—IEEE Conference on Computer Communications, Honolulu, HI, pp. 1880-1888 (2018).

Zhou, Y., et al., "Second-level buffer cache management," Parallel and Distributed Systems, 15(7) (2004).

Yeh, et al., "Forwarding, Caching and Congestion Control in Named Data Networks;" Proceedings of the 1st ACM Conference on Information-Centric Networking, version 3, Feb. 26, 2016.

\* cited by examiner

SYSTEM AND METHOD FOR JOINT DYNAMIC FORWARDING AND CACHING IN CONTENT DISTRIBUTION NETWORKS

RELATED APPLICATION(S)

This application is a divisional of U.S. application Ser. No. 15/022,251, filed Mar. 16, 2016, which is the U.S. National Stage of International Application No. PCT/US2014/058396, filed on Sep. 30, 2014, published in English, which claims the benefit of U.S. Provisional Application No. 62/009,948, filed on Jun. 10, 2014, and U.S. Provisional Application No. 61/884,472, filed Sep. 30, 2013. The entire teachings of the above applications are incorporated herein by reference.

GOVERNMENT SUPPORT

This invention was made with government support under CNS-1205562 from the National Science Foundation and under FA9550-10-1-0166 awarded by the Air Force Office of Scientific Research. The government has certain rights in the invention.

BACKGROUND

Emerging information-centric networking architectures are currently changing the landscape of network research. In particular, named data networking (NDN), or content-centric networking (CCN), is a proposed network architecture for the Internet that replaces the traditional client-server model of communications with one based on the identity of data or content. This architecture more accurately reflects how the Internet is primarily used today: instead of being concerned about communicating with specific nodes, end users are mainly interested in obtaining the data they want. The NDN architecture offers a number of important advantages in decreasing network congestion and delays, and in enhancing network performance in dynamic, intermittent, and unreliable mobile wireless environments.

Content delivery in named data networking (NDN) is accomplished using two types of packets and specific data structures in nodes. Communication is initiated by the data consumer or requester. To receive data, the requester sends out an Interest Packet (also called an "interest"), which carries the (hierarchically structured) name of the desired data (e.g. contentsourcey/videos/WidgetA.mpg/1). The Interest Packet is forwarded by looking up the data name in the Forwarding Information Base (FIB) at each router the Interest Packet traverses along routes determined by a name-based routing protocol. The FIB tells the router to which neighbor node(s) to transmit each Interest Packet. Each router maintains a Pending Interest Table (PIT), which records all Interest Packets currently awaiting matching data. Each PIT entry contains the name of the interest and the set of node interfaces from which the Interest Packets for the same name arrived. When multiple interests for the same name are received, only the first is sent toward the data source. When a node receives an interest that it can fulfill with matching data, it creates a Data Packet containing the data name, the data content, together with a signature by the producer's key. The Data Packet follows in reverse the path taken by the corresponding Interest Packet, as recorded by the PIT state at each router traversed. When the Data Packet arrives at a router, the router locates the matching PIT entry, transmits the data on all interfaces listed in the PIT entry, and then removes the PIT entry. The router may optionally cache a copy of the received Data Packet in its local Content Store, in order to satisfy possible future requests. Consequently, a request for a data object can be fulfilled not only by the content source but also by any node with a copy of that object in its cache.

SUMMARY OF THE INVENTION

The present system and methods provide a more optimized approach for forwarding and caching that is more effective for information-centric networking architectures such as NDN. Architectures such as NDN seek to optimally utilize both bandwidth and storage for efficient content distribution. The present system and methods better meet the need for joint design of traffic engineering and caching strategies, in order to optimize network performance in view of both current traffic loads and future traffic demands, particularly taking advantage of the prevalence of caches at the nodes.

In one aspect of the invention, a computer-implemented method comprises:
(a) receiving, at one or more ports at a node on a network, a plurality of requests for one or more data objects, the network operable to receive and transmit one or more interest packets associated with each requested data object and one or more data packets associated with each requested data object;
(b) in a virtual control plane, computer-executable instructions for:
(b1) receiving at the node a virtual interest packet (VIP) associated with each request for a data object, each VIP comprising an identification of a data object,
(b2) maintaining a VIP count for each requested data object comprising a number of VIPs associated with each requested data object at the node, the VIP count variable over time with demand for each requested data object,
(b3) transmitting the VIP count associated with each requested data object to one or more linked neighbor nodes, and receiving an incoming VIP count associated with each requested data object from the one or more linked neighbor nodes, and
(b4) transmitting each VIP to a linked neighbor node at an outgoing transmission rate; and
(c) in an actual plane, computer-executable instructions for:
(c1) forwarding interest packets for at least a portion of the requested data objects to one of the linked neighbor nodes based on the VIP counts, and
(c2) storing data packets for at least another portion of the requested data objects in transitory cache memory at the node based on the VIP counts.

In a further aspect of the invention, a computer-implemented method comprises:
in a computer network comprising a plurality of nodes and links between the nodes, and operable to transmit one or more interest packets associated with requested data objects and to transmit one or more data packets associated with the requested data objects, computer-executable instructions for:
generating a virtual interest packet (VIP) corresponding to each requested data object, each VIP comprising an identification of a data object;
maintaining a count of VIPs associated with a same requested data object at each node in the network, the VIP count variable over time at each node with demand for each requested data object;

determining incoming VIP transmission rates and outgoing VIP transmission rates at one or more nodes in the network;

transmitting the virtual interest packets to balance distribution of VIPs across the nodes of the network;

satisfying demand for data objects by caching a portion of the data packets in transitory cache memory at one or more nodes to balance demand for the data packets across the network.

A still further aspect comprises the method further comprising maintaining a separate VIP queue at the node for each data object, the VIP queue having a size equivalent to the VIP count for the associated data object.

still further aspect comprises the method further comprising updating the VIP count associated with each requested data object over a time slot.

A still further aspect comprises the method, wherein for each requested data object, the step of updating the VIP count is determined by:
(i) subtracting an outgoing VIP transmission rate summed over neighbor nodes over the time slot from the VIP count at the beginning of the time slot;
(ii) adding a number of incoming exogenous requests for the requested data object received during the time slot;
(iii) adding an incoming VIP transmission rate summed over neighbor nodes received during the time slot; and
(iv) if a data object is cached at the node at that time slot, subtracting a maximum rate in data objects per time slot at which copies of a data packet can be produced from transitory cache memory at the node.

A still further aspect comprises the method, wherein if a negative value is obtained, setting the VIP count to 0.

A still further aspect comprises the method, wherein in step (i) above, setting a negative difference to 0.

A still further aspect comprises the method, further comprising removing all the VIPs associated with the requested data object if the node comprises a content source for the data object.

A still further aspect comprises the method, wherein when the node comprises an entry node onto the network for a data object request, further comprising generating an interest packet and a VIP and setting a VIP count to 1 for the requested data object when a first interest packet for the requested data object arrives.

A still further aspect comprises the method, wherein when the node comprises an entry node onto the network for a data object request, further comprising generating an interest packet and a VIP and incrementing the VIP count by 1 for the requested data object.

A still further aspect comprises the method, wherein step (b4) above further comprises transmitting the VIP for a particular data object to a linked neighbor node with which the node has a largest VIP count difference multiplied by the content size for the particular data object.

A still further aspect comprises the method, wherein step (b4) above further comprises:
selecting the requested data object having a maximum backpressure weight on a link to a neighbor node from a set of allowed links for the requested data object, the backpressure weight comprising a difference between the VIP count at the node and the VIP count received from the neighbor node, multiplied by the content size; and
transmitting the VIP for the selected data object to the neighbor node on the link at the outgoing transmission rate, wherein the outgoing transmission rate comprises a reverse transmission capacity of the link from the neighbor node into the node divided by a data object size for the selected data object.

A still further aspect comprises the method, further comprising selecting the outgoing transmission rate to be 0 for any data object that does not have a maximum backpressure weight on a link with a neighboring node.

A still further aspect comprises the method, further comprising, for a requested data object, transmitting in a single message to a neighbor node during a determined time slot an amount by which to increment the VIP count for the requested data object.

A still further aspect comprises the method, further comprising forwarding an interest packet for a first chunk of a requested data object over a link with a maximum average VIP transmission rate for the requested data object over a sliding time window prior to a time slot, wherein the VIP transmission rate comprises a number of VIPs for the requested data object transmitted over a link during the time slot.

A still further aspect comprises the method, further comprising forwarding subsequent interest packets in an ongoing request for the requested data object on the link used to forward a most recent interest packet for the requested data object.

A still further aspect comprises the method, wherein for each data object request, receiving a plurality of interest packets, each interest packet comprising a request for a chunk of the requested data object.

A still further aspect comprises the method, wherein each data object request comprises a sequence of interest packets requesting all data chunks that comprise the data object.

A still further aspect comprises the method, further comprising checking whether an interest packet requesting a same data object has already been forwarded and if so, adding a name of the data requested by the interest packet and an interface on which the interest packet arrived to a table of pending interests.

A still further aspect comprises the method, further comprising checking whether an interest packet requesting a same data object has already been forwarded, and if not, checking a forward information base to determine to which node or nodes the interest packet can be forwarded and choosing a subset of those nodes for forwarding the interest packet.

A still further aspect comprises the method, further comprising transmitting data packets associated with a requested data object to a neighbor node along a reverse path taken by interest packets associated with the requested data object.

A still further aspect comprises the method, further comprising checking whether a copy of a data object is stored in transitory cache memory at the node, and if the data object is stored at the node, transmitting a copy of the data object on a reverse path toward a source of the data object request.

A still further aspect comprises the method, further comprising:
determining a maximum sum of VIP counts multiplied by sizes of the data objects multiplied by the maximum rates at which the node can produce copies of the data objects, from among all requested data objects that can be stored within transitory cache memory of a determined cache size at the node; and
caching a portion of the requested data objects that contribute to the maximum sum.

A still further aspect comprises the method, further comprising reducing the VIP count for a requested data object by a maximum rate at the node when a requested data object is stored in transitory cache memory, the maximum rate comprising a maximum rate in data objects per time slot at which copies of a data packet can be produced from transitory cache memory at the node.

A still further aspect comprises the method, further comprising:
for each data object, determining a cache score, the cache score comprising an average number of VIPs for the requested data object received at the node over a sliding window of time T prior to a time slot; and
for all contents, storing data packets in the transitory cache memory in order of size of weighted VIP count beginning with a highest weighted VIP count, until a memory storage capacity is reached, the weighted VIP count comprising the VIP count multiplied by the maximum rate at which the node can reproduce copies of the data object.

A still further aspect comprises the method, further comprising:
for each data object, determining a cache score, the cache score comprising an average number of VIPs for the requested data object received at the node over a sliding window of time T prior to a time slot; and
for currently cached objects and a new data object during a time slot, data packets associated with each data object are stored in transitory cache memory in order of a weighted cache score associated with each data object, beginning with a data object with a largest weighted cache score, the weighted cache score comprising the cache score divided by the content size.

A still further aspect comprises the method, further comprising removing a currently cached data object from the transitory cache memory and adding a new data object based on the order of the weighted cache score.

A still further aspect comprises the method, wherein if the node comprises an entry node for an interest packet associated with a requested data object, further comprising:
in a transport layer for controlling entry onto the network, storing a newly arriving object request at a transport layer transitory storage reservoir and maintaining a corresponding transport layer VIP count in a transport layer VIP queue; and
admitting object requests and associated VIPs from the transport layer onto the network layer at a rate that maximizes a utility function.

A still further aspect comprises the method, further comprising admitting object requests and associated VIPs from the transport layer onto the network layer at a rate to achieve a tradeoff between an achieved utility and an achieved network delay due to network congestion.

A still further aspect comprises the method, further comprising:
initializing a virtual VIP count for the requested data object in the transport layer; and
over each time slot, when the virtual VIP count is greater than the transport layer VIP count for a requested data object, admitting VIPs from the transport layer VIP queue at a rate determined by a minimum of the transport layer VIP count for the requested data object and a maximum rate for admitting VIPs from the transport layer VIP queue.

A still further aspect comprises the method, further comprising:
over each time slot, choosing an auxiliary variable comprising an input rate to a corresponding virtual queue, the auxiliary variable comprising a value equal to or greater than 0 and equal to or less than a maximum input rate from the transport layer to the network layer, the auxiliary variable further selected to maximize the utility function multiplied by a utility-delay tradeoff control parameter less the virtual VIP count multiplied by the auxiliary variable; and
updating the virtual VIP count over each time slot by subtracting the admitted rate from the virtual VIP count and adding the auxiliary variable.

A still further aspect comprises the method, wherein for each requested data object, a step of updating the transport layer VIP queue is determined by:
(i) subtracting an amount of VIPs admitted to a network layer VIP queue during a previous time slot from a transport layer VIP queue at the previous time slot; and
(ii) adding a number of incoming exogenous requests for the requested data object received during the previous time slot.

A still further aspect comprises the method, wherein in step (i), setting a negative value to 0.

A still further aspect comprises the method, wherein if the transport layer VIP queue is determined to be greater than a buffer size for the transport layer VIP queue over a time slot, then the transport layer VIP queue is set to the buffer size for that time slot.

A still further aspect comprises the method, wherein for each requested data object, the step of updating the VIP count on the network layer is determined by:
(i) subtracting an outgoing VIP transmission rate summed over neighbor nodes over the time slot from the VIP count at the beginning of the time slot;
(ii) adding a number of VIPs admitted to a network layer VIP queue from the transport layer VIP queue for the requested data object received during the time slot;
(iii) adding an incoming VIP transmission rate summed over neighbor nodes received during the time slot; and
(iv) if a data object is cached at the node at that time slot, subtracting a maximum rate in data objects per time slot at which copies of a data packet can be produced from transitory cache memory at the node.

A still further aspect comprises the method, wherein the utility function comprises a mathematical function that is non-decreasing and concave.

A still further aspect comprises the method, wherein the utility function comprises an $\alpha$-fairness function, a logarithmic function, or an arctangent function.

A still further aspect comprises the method, wherein a data packet comprises a data name, data content, and signature data.

A still further aspect comprises the method, wherein the network comprises a named data network, a content-centric network, an information centric network, a content distribution network, a data center, a cloud computing architecture, or a peer to peer network.

In a still further aspect, a system for forwarding and caching in a network, comprises:
a network device comprising:
one or more ports configured to receive and transmit requests for data objects in the form of interest packets and to receive and transmit data objects in the form of data packets;
non-transitory computer readable memory encoded with executable instructions, and transitory computer readable cache memory; and
a processor operable to execute the instructions in the non-transitory computer readable memory to, in a virtual plane:

receive at the node a virtual interest packet (VIP) associated with each request for a data object, each VIP comprising an identification of a data object, maintain a VIP count for each requested data object comprising a number of VIPs associated with each requested data object at the node, the VIP count variable over time with demand for each requested data object, transmit the VIP count associated with each requested data object to one or more linked neighbor nodes, and receive an incoming VIP count associated with each requested data object from the one or more linked neighbor nodes, and transmit each VIP to a linked neighbor node at an outgoing transmission rate; and in an actual plane:

forward interest packets for at least a portion of the requested data objects to one of the linked neighbor nodes based on the VIP counts, and store data packets for at least another portion of the requested data objects in transitory cache memory at the node based on the VIP counts.

A still further aspect comprises the system, wherein the network device comprises a router.

A still further aspect comprises the system, wherein the network device comprises a node on the network.

A still further aspect comprises the system, wherein the network comprises a named data network, a content-centric network, an information centric network, a content distribution network, a data center, a cloud computing architecture, or a peer to peer network.

A still further aspect comprises the system, wherein the processor is further operable to execute instructions to maintain a separate VIP queue at the node for each data object, the VIP queue having a size equivalent to the VIP count for the associated data object.

A still further aspect comprises the system, wherein the processor is further operable to execute instructions to update the VIP count associated with each requested data object over a time slot.

A still further aspect comprises the system, wherein for each requested data object, the instructions to update the VIP count further comprising instructions to:

(i) subtract an outgoing VIP transmission rate summed over neighbor nodes over the time slot from the VIP count at the beginning of the time slot;

(ii) add a number of incoming exogenous requests for the requested data object received during the time slot;

(iii) add an incoming VIP transmission rate summed over neighbor nodes received during the time slot; and (iv) if a data object is cached at the node at that time slot, subtract a maximum rate in data objects per time slot at which copies of a data packet can be produced from transitory cache memory at the node.

A still further aspect comprises the system, further comprising in instruction (i), instructions to set a negative difference to 0.

A still further aspect comprises the system, further comprising instructions to set the VIP count to 0 if a negative value is obtained.

A still further aspect comprises the system, wherein the processor is further operable to execute instructions to remove all the VIPs associated with the requested data object if the network device comprises a content source for the data object.

A still further aspect comprises the system, wherein the network device comprises an entry node onto the network for a data object request, and the processor is further operable to execute instructions to generate an interest packet and a VIP and setting a VIP count to 1 for the requested data object when the first interest packet arrives.

A still further aspect comprises the system, wherein the network device comprises an entry node onto the network for a data object request, and the processor is further operable to execute instructions to generate an interest packet and a VIP and increment a VIP count by 1 for the requested data object.

A still further aspect comprises the system, wherein the processor is further operable to execute instructions to transmit the VIP for a particular data object to a linked neighbor node with which the network device has a largest VIP count difference multiplied by the content size for the particular data object.

A still further aspect comprises the system, wherein the processor is further operable to execute instructions to:

select the requested data object having a maximum backpressure weight on a link to a neighbor node from a set of allowed links for the requested data object, the backpressure weight comprising a difference between the VIP count at the network device and the VIP count received from the neighbor node, multiplied by the content size; and transmit the VIP for the selected data object to the neighbor node on the link at the outgoing transmission rate, wherein the outgoing transmission rate comprises a reverse transmission capacity of the link from the neighbor node into the network device divided by a data object size for the selected data object.

A still further aspect comprises the system, wherein the processor is further operable to execute instructions to select the outgoing transmission rate to be 0 for any data object that does not have a maximum backpressure weight on a link with a neighboring node.

A still further aspect comprises the system, wherein the processor is further operable to execute instructions to transmit, for a requested data object, in a single message to a neighbor node during a determined time slot an amount to increment the VIP count for the requested data object.

A still further aspect comprises the system, wherein the processor is further operable to execute instructions to forward an interest packet for a first chunk of a requested data object over a link with a maximum average VIP transmission rate for the requested data object over a sliding time window prior to a time slot, wherein the VIP transmission rate comprises a number of VIPs for the requested data object transmitted over a link during the time slot.

A still further aspect comprises the system, wherein the processor is further operable to execute instructions to forward subsequent interest packets in an ongoing request for the requested data object on the link used to forward a most recent interest packet for the requested data object.

A still further aspect comprises the system, wherein each data object request comprises a sequence of interest packets requesting all data chunks that comprise the data object.

A still further aspect comprises the system, wherein the processor is further operable to execute instructions to check whether an interest packet requesting a same data object has already been forwarded and if so, to add a name of the data requested by the interest packet and an interface on which the interest packet arrived to a table of pending interests.

A still further aspect comprises the system, wherein the processor is further operable to execute instructions to check whether an interest packet requesting a same data object has already been forwarded, and if not, check a forward information base to determine to which node or nodes the interest packet can be forwarded and choose a subset of those nodes for forwarding the interest packet.

A still further aspect comprises the system, wherein the processor is further operable to execute instructions to transmit data packets associated with a requested data object to a neighbor node along a reverse path taken by interest packets associated with the requested data object.

A still further aspect comprises the system, wherein the processor is further operable to execute instructions to check whether a copy of a data object is stored in the transitory cache memory at the node, and if the data object is stored at the node, transmit a copy of the data object on a reverse path to a source of the data object request.

A still further aspect comprises the system, wherein the processor is further operable to execute instructions:
determining a maximum sum of VIP counts multiplied by sizes of the data objects multiplied by the maximum rates at which the node can produce copies of the data objects, from among all requested data objects that can be stored within transitory cache memory of a determined cache size at the node; and
caching a portion of the requested data objects that contribute to the maximum sum.

A still further aspect comprises the system, wherein the processor is further operable to execute instructions reducing the VIP count for a requested data object by a maximum rate at the node when a requested data object is stored in transitory cache memory, the maximum rate comprising a maximum rate in data objects per time slot at which copies of a data packet can be produced from transitory cache memory at the node.

A still further aspect comprises the system, wherein the processor is further operable to execute instructions:
for each data object, determining a cache score, the cache score comprising an average number of VIPs for the requested data object received at the node over a sliding window of time T prior to a time slot; and
for all contents, storing data packets in the transitory cache memory in order of size of weighted VIP count beginning with a highest weighted VIP count, until a memory storage capacity is reached, the weighted VIP count comprising the VIP count multiplied by the maximum rate at which the node can reproduce copies of the data object.

A still further aspect comprises the system, wherein the processor is further operable to execute instructions:
for each data object, determining a cache score, the cache score comprising an average number of VIPs for the requested data object received at the node over a sliding window of time T prior to a time slot; and
for currently cached objects and a new data object during a time slot, data packets associated with each data object are stored in transitory cache memory in order of a weighted cache score associated with each data object, beginning with a data object with a largest weighted cache score, the weighted cache score comprising the cache score divided by the content size.

A still further aspect comprises the system, wherein the processor is further operable to execute instructions for removing a currently cached data object from the transitory cache memory and adding a new data object based on the order of the weighted cache score.

A still further aspect comprises the system, wherein if the node comprises an entry node for an interest packet associated with a requested data object, wherein the processor is further operable to execute instructions:

in a transport layer for controlling entry onto the network, storing a newly arriving object request at a transport layer transitory storage reservoir and maintaining a corresponding transport layer VIP count in a transport layer VIP queue; and
admitting object requests and associated VIPs from the transport layer onto the network layer at a rate that maximizes a utility function.

A still further aspect comprises the system, wherein the processor is further operable to execute instructions for admitting object requests and associated VIPs from the transport layer onto the network layer at a rate to achieve a tradeoff between an achieved utility and an achieved network delay due to network congestion.

A still further aspect comprises the system, wherein the processor is further operable to execute instructions for:
initializing a virtual VIP count for the requested data object in the transport layer; and
over each time slot, when the virtual VIP count is greater than the transport layer VIP count for a requested data object, admitting VIPs from the transport layer VIP queue at a rate determined by a minimum of the transport layer VIP count for the requested data object and a maximum rate for admitting VIPs from the transport layer VIP queue.

A still further aspect comprises the system, further comprising:
over each time slot, choosing an auxiliary variable comprising an input rate to a corresponding virtual queue, the auxiliary variable comprising a value equal to or greater than 0 and equal to or less than a maximum input rate from the transport layer to the network layer, the auxiliary variable further selected to maximize the utility function multiplied by a utility-delay tradeoff control parameter less the virtual VIP count multiplied by the auxiliary variable; and
updating the virtual VIP count over each time slot by subtracting the admitted rate from the virtual VIP count and adding the auxiliary variable.

A still further aspect comprises the system, wherein for each requested data object, wherein the processor is further operable to execute instructions for updating the transport layer VIP queue by:
(i) subtracting an amount of VIPs admitted to a network layer VIP queue during a previous time slot from a transport layer VIP queue at the previous time slot; and
(ii) adding a number of incoming exogenous requests for the requested data object received during the previous time slot.

A still further aspect comprises the system, wherein the processor is further operable to execute instructions for, in (i), setting a negative value to 0.

A still further aspect comprises the system, wherein if the transport layer VIP queue is determined to be greater than a buffer size for the transport layer VIP queue over a time slot, then the processor is further operable to execute instructions for the transport layer VIP queue to set the buffer size for that time slot.

A still further aspect comprises the system, wherein for each requested data object, the processor is further operable to execute instructions for of updating the VIP count on the network layer by:
(i) subtracting an outgoing VIP transmission rate summed over neighbor nodes over the time slot from the VIP count at the beginning of the time slot;

(ii) adding a number of VIPs admitted to a network layer VIP queue from the transport layer VIP queue for the requested data object received during the time slot;

(iii) adding an incoming VIP transmission rate summed over neighbor nodes received during the time slot; and (iv) if a data object is cached at the node at that time slot, subtracting a maximum rate in data objects per time slot at which copies of a data packet can be produced from transitory cache memory at the node.

A still further aspect comprises the system, wherein the utility function comprises a mathematical function that is non-decreasing and concave.

A still further aspect comprises the system, wherein the utility function comprises an α-fairness function, a logarithmic function, or an arctangent function.

A still further aspect comprises the system, where a data packet comprises a data name, data content, and signature data.

A still further aspect comprises the system, wherein the network comprises a named data network, a content-centric network, an information centric network, a content distribution network, a data center, a cloud computing architecture, or a peer to peer network.

DESCRIPTION OF THE DRAWINGS

The invention will be more fully understood from the following detailed description taken in conjunction with the accompanying drawings in which.

DETAILED DESCRIPTION OF THE INVENTION

Figure 1:
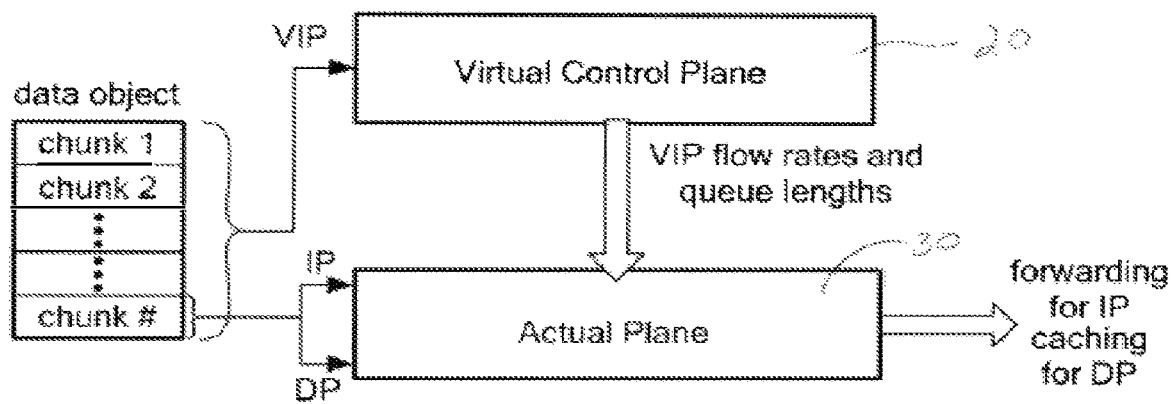
FIG. 1 is a schematic illustration of a Virtual Interest Packet (VIP) framework according to the present invention.

Assuming the prevalence of caches, the usual approaches for forwarding and caching may no longer be effective for information-centric networking architectures such as NDN. Instead, these architectures seek to optimally utilize both bandwidth and storage for efficient content distribution. This highlights the need for joint design of traffic engineering and caching strategies, in order to optimize network performance in view of both current traffic loads and future traffic demands. Unlike many existing works on centralized algorithms for static caching, the present system develops distributed, dynamic algorithms that can address caching and forwarding under changing content, user demands and network conditions.

To address this fundamental problem, the present invention provides a framework for the design of high performing NDN networks using "Virtual Interest Packets" (VIPs), which capture the measured demand for the respective data objects in the network. The VIP framework employs a virtual control plane that operates on VIPs, and an actual plane that handles Interest Packets and Data Packets. Within the virtual plane, distributed control algorithms operate on VIPs, yielding desirable performance in terms of network metrics of concern. The flow rates and queue lengths of the VIPs resulting from the control algorithm in the virtual plane are then used to specify the forwarding and caching policies in the actual plane.

The general VIP framework allows for a large class of control and optimization algorithms operating on VIPs in the virtual plane, as well as a large class of mappings which use the VIP flow rates and queue lengths from the virtual plane to specify forwarding and caching in the actual plane. Thus, the VIP framework presents a powerful paradigm for designing efficient NDN-based networks with different properties and trade-offs. To illustrate the utility of the VIP framework, two embodiments of the framework are presented. The first embodiment includes a distributed forwarding and caching policy in the virtual plane that achieves effective load balancing and adaptively maximizes the throughput of VIPs, thereby maximizing the user demand rate for data objects satisfied by the NDN network. The second embodiment includes distributed algorithms that achieve not only load balancing but also stable caching configurations. Experimental results show that the latter set of algorithms have unexpectedly superior performance in terms of low user delay and high rate of cache hits, relative to several baseline routing and caching policies.

Initially, a network model embodying the VIP framework is described.

Consider a connected multi-hop (wireline) network modeled by a directed graph $\mathcal{G} = (\mathcal{N}, \mathcal{L})$, where $\mathcal{N}$ and $\mathcal{L}$ denote the sets of N nodes and L directed links, respectively. Assume that $(b, a) \in \mathcal{L}$ whenever $(a, b) \in \mathcal{L}$. Let $C_{ab} > 0$ be the transmission capacity (in bits/second) of link $(a, b) \in \mathcal{L}$. Let $L_n$ be the cache size (in bits) at node $n \in \mathcal{N}$ ($L_n$ can be zero).

Assume that content in the network are identified as data objects, with the object identifiers determined by an appropriate level within the hierarchical naming structure. These identifiers may arise naturally from the application, and are determined in part by the amount of control state that the network is able to maintain. Typically, each data object (for example, /contentsource/videos/WidgetA.mpg) is an ordered sequence of data chunks (for example, /contentsource/videos/WidgetA.mpg/1). Assume that any data object is demarcated by a starting chunk and an ending chunk. Content delivery in NDN operates at the level of data chunks. That is, each Interest Packet requests a particular data chunk, and a matching Data Packet comprises the requested data chunk, the data chunk name, and a signature. A request for a data object comprises a sequence of Interest Packets which request all the data chunks of the object, where the sequence starts with the Interest Packet requesting the starting chunk, and ends with the Interest Packet requesting the ending chunk (The data chunks in between the starting and ending chunks can be requested in any order.) In the VIP framework, described further below, distributed control algorithms are developed in a virtual control plane operating at the data object level, while forwarding of Interest Packets and caching of Data Packets in the actual plane operate at the data chunk level.

The forwarding and caching algorithms are operated over a set $\mathcal{K}$ of K data objects in the network. $\mathcal{K}$ may be determined by the amount of control state that the network is able to maintain. Since the data object popularity distribution evolves at a relatively slow time scale compared to the caching and forwarding, in one embodiment, $\mathcal{K}$ includes the set of the most popular data objects in the network, which is typically responsible for most of the network congestion. (The less popular data objects not in $\mathcal{K}$ may be distributed using, for example, simple forwarding techniques such as shortest-path routing with little or no caching.) Assume that data object k has size $z^k$ (in bits). Considering the scenario where $L_n < \Sigma_{k \in \mathcal{N}} z^k$ for all $n \in \mathcal{N}$, it is apparent that no node can cache all data objects.

For each data object $k \in \mathcal{K}$, assume that there is a unique node $src(k) \in \mathcal{N}$ which serves as the content source for the object. Interest Packets for chunks of a given data object can enter the network at any node, and exit the network upon being satisfied by a matching Data Packet at the content source for the object, or at the nodes which decide to cache the object. For convenience, it is assumed that the content sources are fixed, while the caching points may vary in time. However, it will be appreciated that the content sources can vary over time also.

Assume that routing (topology discovery and data reachability) has already been accomplished in the network, so that the forwarding information bases (FIBs) have been populated for the various data objects. Upon the arrival of an Interest Packet at an NDN node, the following sequence of events happens. First, the node checks its Content Store (CS) to see if the requested data object chunk is locally cached. If it is, then the Interest Packet is satisfied locally, and a data packet containing a copy of the data object chunk is sent on the reverse path. If not, the node checks its PIT to see if an Interest Packet requesting the same data object chunk has already been forwarded. If so, the new Interest Packet (also sometimes called "interest," for short) is suppressed while the incoming interface associated with the new interest is added to the PIT. Otherwise, the node checks the FIB to see to what node(s) the interest can be forwarded, and chooses a subset of those nodes for forwarding the interest. Upon receiving a Data Packet, a node needs to determine whether to make a copy of the Data Packet and cache the copy or not. Thus, policies for the forwarding of Interest Packets and the caching of Data Packets are of importance in the NDN architecture. Thus far, the design of the strategy layer for NDN remains largely unspecified in the prior art. Moreover, in the currently known CCN implementation, a Data Packet is cached at every node on the reverse path. This, however, may not be possible or desirable when cache space is limited.

The present focus is on the technological problem of finding dynamic forwarding and caching policies that exhibit superior performance in terms of metrics such as the total number of data object requests satisfied (i.e., all corresponding Data Packets are received by the requesting node), the delay in satisfying Interest Packets, and cache hit rates. A VIP framework to solve this problem is described as follows.

Virtual Interest Packets and the VIP Framework

The VIP framework for joint dynamic forwarding and caching relies on the new device of virtual interest packets (VIPs), which are generated as follows. As illustrated in FIG. 1, for each request for data object $k \in \mathcal{K}$ entering the network, a corresponding VIP for object $k \in \mathcal{K}$ is generated. (More generally, VIPs can be generated at a rate proportional to that of the corresponding data object requests, which can in some cases improve the convergence speed of the proposed algorithms.) Whereas IPs may be suppressed and collapsed at NDN nodes (if there is already a PIT entry for that data object), the VIPs are not suppressed or collapsed. The VIPs capture the measured demand for the respective data objects in the network. The VIPs can be seen to represent content popularity, which is empirically measured, rather than being based on knowledge of a prior distribution. Specifically, the VIP count for a data object in a given part of the network represents the local level of interest in the data object, as determined by network topology and user demand.

The VIP framework employs a virtual control plane 20 that operates on VIPs at the data object level, and an actual plane 30 that handles Interest Packets and Data Packets at the data chunk level. This approach reduces the implementation complexity of the VIP algorithm in the virtual plane considerably (as compared with operating on data chunks in the virtual plane). Also, as shown further below, this approach leads to an implementation which forwards all the Interest Packets for the same ongoing request for a data object on the same path, and which caches the entire data object (comprising all data chunks) at a caching node (as opposed to caching different chunks of the same data object at different nodes). At the same time, the approach also allows Interest Packets for non-overlapping requests for the same data object to be forwarded on different paths, thus making multi-path forwarding of object requests possible. (In principle, the VIP algorithm in the virtual plane can be applied at the chunk level (corresponding to the case where there is only one chunk in each data object). In this case, the virtual and actual planes operate at the same granularity. On the other hand, the complexity of implementing the algorithm in the virtual plane would be much larger.)

Within the virtual plane, distributed control algorithms operate on VIPs, aimed at yielding improved performance in terms of network metrics of concern. The flow rates and queue lengths of the VIPs resulting from the control algorithm in the virtual plane are then used to specify the forwarding and caching policies in the actual plane. (See FIG. 1.) Control algorithms operating in the virtual plane can take advantage of local information on network demand (as represented by the VIP counts), which is unavailable in the actual plane due to interest collapsing and suppression.

In order to illustrate the utility of the VIP framework, two particular exemplary embodiments of the framework are presented in greater detail below. For both embodiments, the following properties hold. First, the VIP count is used as a common metric for determining both the forwarding and caching algorithms in the virtual and actual control planes. Second, the forwarding strategy in the virtual plane achieves load balancing through the application of the backpressure algorithm to the VIP queue state. Finally, one caching algorithm determines the caching locations and cache replacement policy for both the virtual and actual planes. The two embodiments differ in the manner in which they use the VIP count to determine caching actions.

VIP Dynamics

The dynamics of the VIPs are specified within the virtual plane. Consider time slots of length 1 (without loss of generality) indexed by t=1, 2, .... Specifically, time slot t refers to the time interval [t, t+1). Within the virtual plane, each node $n \in \mathcal{N}$ maintains a separate VIP queue for each data object $k \in \mathcal{K}$. Note that no data is contained in these VIPs. Thus, the VIP queue size for each node n and data object k at the beginning of slot t (i.e., at time t) is represented by a counter $V_n^k(t)$. (The assumption is made that VIPs can be quantified as a real number. This is reasonable when the VIP counts are large.) Initially, all VIP counters are set to 0, that is, $V_n^k(1)=0$. As VIPs are created along with data object requests, the counters for the corresponding data object are incremented accordingly at the entry nodes. After being forwarded through the network (in the virtual plane), the VIPs for object k are removed at the content source src(k), and at nodes that have cached object k. That is, the content source and the caching nodes are the sinks for the VIPs. Physically, the VIP count can be interpreted as a potential. For any data object, there is a downward "gradient" from entry points of the data object requests to the content source and caching nodes.

Each data object request is realized as an ordered sequence of Interest Packets requesting all the data chunks which constitute the data object. An exogenous request for data object k is considered to have arrived at node n if the Interest Packet requesting the first data chunk of data object k has arrived at node n. Let $A_n^k(t)$ be the number of exogenous data object request arrivals at node n for object k during slot t (i.e., over the time interval [t, t+1)). (A node n can be thought of as a point of aggregation that combines many network users. While a single user may request a given data object only once, an aggregation point is likely to submit many request for a given data object over time.) For every arriving data object request, a corresponding VIP is generated. The long-term exogenous VIP arrival rate at node n for object k is $$\lambda_n^k \triangleq \lim_{t \to \infty} \frac{1}{t} \sum_{\tau=1}^{t} A_n^k(\tau)$$

Assume that the arrival processes $\{A_n^k(1); t=1, 2, ...\}$ are mutually independent with respect to n and k.

Let $\mu_{ab}^k(t) \geq 0$ be the allocated transmission rate of VIPs for data object k over link (a, b) during time slot t. VIP transmissions between nodes do not involve actual packets being sent. Rather, for each time slot t, a single message between the sending node and the receiving node can summarize all the VIP transmissions during that time slot; the transmitting VIP queue decrements its counter by the number of VIPs transmitted, and the receiving VIP queue increments its counter by the same number.

In the virtual plane, assume that at each time t, each node $n \in \mathcal{N}$ can gain access to any data object $k \in \mathcal{K}$ for which there is interest at n, and potentially cache the object locally. Let $s_n^k(t) \in \{0, 1\}$ represent the caching state for object k at node n during slot t, where $s_n^k(t)=1$ if object k is cached at node n during slot t, and $s_n^k(t)=0$ otherwise. Now note that even if $s_n^k(t)=1$, the content store at node n can satisfy only a limited number of VIPs during one time slot. This is because there is a maximum rate $r_n^k$ (in objects per slot) at which node n can produce copies of cached object k. (The maximum rate $r_n^k$ may reflect the I/O rate of the storage disk.)

Consistent with sequence of events triggered upon the arrival of an IP at an NDN node, as described above, the time evolution of the VIP count at node n for object k is as follows:

$$V_n^k(t+1) \leq \left( \left( V_n^k(t) - \sum_{b \in N} \mu_{nb}^k(t) \right)^+ + A_n^k(t) + \sum_{a \in N} \mu_{an}^k(t) - r_n^k s_n^k(t) \right)^+ \quad (1)$$

where $(x)^+ \triangleq \max(x, 0)$. Furthermore, $V_n^k(t)=0$ for all $t \geq 1$ if n=src(k).

From Equation (1), it can be seen that the VIPs for data object k at node n at the beginning of slot r are transmitted during slot t at the rate $\Sigma_{b \in \mathcal{N}} \mu_{nb}^k(t)$. The remaining VIPS $(V_n^k(t) - \Sigma_{b \in \mathcal{N}} \mu_{nb}^k(t))^+$, as well as the exogenous and endogenous VIP arrivals during slot t, are reduced by $r_n^k$ at the end of slot t if object k is cached at node n in slot t ($s_n^k(t)=1$). The VIPs still remaining are then transmitted during the next slot t+1. Note that Equation (1) is an inequality because the actual number of VIPs for object k arriving to node n during slot t may be less than $\Sigma_{a \in \mathcal{N}} \mu_{na}^k(t)$) if the neighboring nodes have little or no VIPs of object k to transmit.

Throughput Optimal VIP Control

An exemplary embodiment of the VIP framework is described in which the VIP count is used as a common metric for determining both the forwarding and caching algorithms in the virtual and actual control planes. The forwarding strategy within the virtual plane is given by the application of the backpressure algorithm to the VIP queue state. The backpressure algorithm has been is described in the context of radio networks in L. Tassiulas and A. Ephremides; Stability properties of constrained queueing systems and scheduling for maximum throughput in multihop radio networks; *IEEE Trans. Autom. Control*, 37(12):1936-1949, December 1992.) The backpressure algorithm is suitable for an anycast network of traffic commodities (and not necessarily source-destination pairs), where traffic for all commodities can enter any given node, and traffic is considered to have exited the network when it reaches any of the destinations corresponding to a given commodity, and thus it is suitable for a content-centric network setting such as NDN. The backpressure algorithm, used for routing in conventional source-destination based networks, is used here for the first time for forwarding in information-centric networks. Furthermore, backpressure forwarding is being used in the virtual plane, rather than in the actual plane, where interest collapsing and suppression make the application of the algorithm impractical.

The caching strategy is given by the solution of a max-weight problem involving the VIP queue length. The VIP flow rates and queue lengths are then used to specify forwarding and caching strategies in the actual plane, which handles Interest Packets and Data Packets. It is shown that the joint distributed forwarding and caching strategy adaptively maximizes the throughput of VIPs, thereby maximizing the user demand rate for data objects satisfied by the network.

The joint forwarding and caching algorithm for VIPs in the virtual control plane is described as follows.

ALGORITHM 1. At the beginning of each time slot t, observe the VIP counts $(V_n^k(1))_{k \in \mathcal{K}, n \in \mathcal{N}}$ and perform forwarding and caching in the virtual plane as follows.

Forwarding: For each data object $k \in \mathcal{K}$ and each link $(a, b) \in \mathcal{L}^k$, choose $$\mu_{ab}^k(t) = \begin{cases} C_{ba}/z^k, & W_{ab}^*(t) > 0 \text{ and } k = k_{ab}^*(t) \\ 0, & \text{otherwise} \end{cases} \quad (2)$$

where $$W_{ab}^k(t) \triangleq (V_a^k(t) - V_b^k(t))z^k, \quad (3)$$

$$k_{ab}^*(t) \triangleq \arg\max_{k:(a,b) \in \mathcal{L}^k} W_{ab}^k(t)$$

$$W_{ab}^*(t) \triangleq \left(W_{ab}^{k_{ab}^*(t)}(t)\right)^+$$

Here, $\mathcal{L}^k$ is the set of links which are allowed to transmit the VIPs of object k, $W_{ab}^k(t)$ is the backpressure weight of object k on link (a, b) at time t, and $k_{ab}^*(t)$ is the data object which maximizes the backpressure weight on link (a, b) at time t.

Caching: At each node $n \in \mathcal{N}$, choose $\{s_n^k(t)\}$ to $$\text{maximize} \sum_{k \in \mathcal{K}} V_n^k(t) z^k r_n^k s_n^k \text{ subject to } \sum_{k \in \mathcal{K}} z^k s_n^k \leq L_n \quad (4)$$

Based on the forwarding an caching in Equations (2) and (4), the VIP count is updated according to Equation (1).

At each time t and for each link (a, b), the backpressure-based forwarding algorithm allocates the entire normalized "reverse" link capacity $C_{bd}/z^{k_{ab}^*(t)}$ to transmit the VIPs for the data object $k_{ab}^*(t)$ which maximizes the VIP queue difference $W_{ab}^k(t)$ in Equation (3). Backpressure forwarding maximally balances out the VIP counts, and therefore the demand for data objects in the network, thereby minimizing the probability of demand building up in any one part of the network and causing congestion. Backpressure forwarding maximally spreads out the VIP levels from the high potential at the entry nodes to the low potential of the content source nodes and caching nodes, thus lowering the overall potential in the network.

The caching strategy is given by the optimal solution to the max-weight knapsack problem in Equation (4), which can be approximately solved in a greedy manner as follows. For each $n \in \mathcal{K}$, let $(k_1, k_2, \ldots k_K)$ be a permutation of (1, 2, \ldots, K) such that $V_n^{k_1} r_n^{k_1}(t) \geq V_n^{k_2} r_n^{k_2}(t) \ldots \geq \ldots V_n^{kK} r_n^{kK}(t)$. Let $$i_n = \max_i \sum_{l=1}^{i} z^{kl} \leq L_n$$

Then for each $n \in \mathcal{N}$, choose $$s_n^k(t) = \begin{cases} 1, & k \in \{k_1, \ldots, k_{i_n}\} \\ 0, & \text{otherwise} \end{cases} \quad (5)$$

Thus, e objects with the highest weighted VIP counts are cached.

More generally, the caching strategy can be determined by any algorithm that solves the knapsack problem described above in Equation (4). Two suitable examples are 1) the amoeboid organism algorithm (Amoeboid organism algorithm: Zhang, Xiaoge, et al. "Solving 0-1 knapsack problems based on amoeboid organism algorithm." Applied Mathematics and Computation 219.19 (2013): 9959-9970); and 2) a chemical reaction optimization with greedy strategy (Chemical reaction optimization with greedy strategy (CORG): Truong, Tung Khac, Kenli Li, and Yuming Xu. "Chemical reaction optimization with greedy strategy for the 0-1 knapsack problem." Applied Soft Computing 13.4 (2013): 1774-1780.) Other algorithms for solving the knapsack problem are known and can be used.

Note that both the backpressure-based forwarding algorithm and the max-weight caching algorithm are distributed. To implement the forwarding algorithm, each node must exchange its VIP queue state with only its neighbors. The implementation of the caching algorithm is local once the updated VIP queue state has been obtained.

To characterize the implementation complexity of Algorithm 1, it is noted that both the computational and communication complexity of the back pressure forwarding algorithm per time slot is $O(N^2 K)$, where the bound can be improved to O(NDK) if D is the maximum node degree in the network. Assuming fixed cache sizes, the computational complexity of the caching algorithm per time slot can be found to be O(NK).

In the following section, it is shown that the forwarding and caching strategy described in Algorithm 1 is throughput optimal within the virtual plane, in the sense of maximizing the throughput of VIPs in the network $\mathcal{G}=(\mathcal{N}, \mathcal{L})$ with appropriate transmission rate constraints.

Maximizing VIP Throughput

It is now shown that Algorithm 1 adaptively maximizes the throughput of VIPs in the network $\mathcal{G}=(\mathcal{N}, \mathcal{L})$ with appropriate transmission rate constraints. In the following, it is assumed that (i) the VIP arrival processes $\{A_n^k(t); t=1, 2, \ldots\}$ are mutually independent with respect to n and k; (ii) for all $n \in \mathcal{N}$ and $k \in \mathcal{K}$, $\{A_n^k(t); t=1,2,\ldots\}$ are independent and identically distributed (i.i.d.) with respect to t; and (iii) for all n and k, $A_n^k(t) \leq A_{n,max}^k$ for all t.

To determine the constraints on the VIP transmission rates $\mu_{ab}^k(t)$, note that Data Packets for the requested data object must travel on the reverse path taken by the Interest Packets. Thus, in determining the transmission of the VIPs, we take into account the link capacities on the reverse path as follows:

$$\sum_{k \in \mathcal{K}} \mu_{ab}^k(t) z^k \leq C_{ba}, \text{ for all } (a,b) \in \mathcal{L} \quad (6)$$

$$\mu_{ab}^k(t) = 0, \text{ for all } (a,b) \notin \mathcal{L}^k \quad (7)$$

where $C_{ba}$ is the capacity of "reverse" link (b, a), and $\mathcal{L}^k$ is the set of links that are allowed to transmit the VIPs of object k (equivalently, the set of the corresponding reverse links that are allowed to transmit the Data Packets of object k).

VIP Stability Region

To present the throughput optimality argument, the VIP stability region is first defined. The VIP queue at node n is stable if $$\lim_{t \to \infty} \sup \frac{1}{t} \sum_{\tau=1}^{t} 1_{\{\nu_n^k(\tau) > \xi\}} d\tau \to 0 \text{ as } \xi \to \infty,$$

where I is the indicator function. The VIP network stability region A is the closure of the set of all VIP arrival rates $(\lambda_n^k)_{k \in \mathcal{K}, n \in \mathcal{N}}$ for which there exists some feasible joint forwarding and caching policy that can guarantee that all VIP queues are stable. By feasible, it is meant that at each time t, the policy specifies a forwarding rate vector $(\mu_{ab}^k(t))_{k \in \mathcal{K}, (a,b) \in \mathcal{L}}$ satisfying Equations (6)-(7), and a caching vector $(s_n^k(t))_{k \in \mathcal{K}, n \in \mathcal{N}}$ satisfying the cache size limits $(L_n)_{n \in \mathcal{N}}$.

Note that if the interest packets are not collapsed or suppressed at the PITs, then the interest packet stability region in the actual plane is the same as the VIP stability region in the virtual plane.

The following result characterizes the VIP stability region in the virtual plane (or equivalently the interest packet stability region in the actual plane when there is no collapsing or suppression at the PITs), for the case where all content sizes are the same, i.e., $z^k=z$ for all $k \in \mathcal{K}$.

THEOREM 1 (VIP STABILITY REGION). The VIP stability region of the network $\mathcal{G}=(\mathcal{N}, \mathcal{L})$ with link capacity constraints (6)-(7), and with VIP queue evolution (1), is the set $\Lambda$ consisting of all VIP arrival rates $(\lambda_n^k)_{k \in \mathcal{K}, n \in \mathcal{N}}$ such that there exist flow variables $(f_{ab}^k)_{k \in \mathcal{K}, (a,b) \in \mathcal{L}}$ and storage variables $$(\beta_{n,i,l})_{n \in \mathcal{N}, i=1, \ldots, \binom{K}{l}; l=0, \ldots, i_n \triangleq \lfloor L_n/z \rfloor}$$

satisfying $$(\beta_{n,i,l})_{n \in \mathcal{N}, i=1, \ldots, \binom{K}{l}; l=0, \ldots, i_n \triangleq \lfloor L_n/x \rfloor}$$

satisfying $$f_{ab}^k \geq 0, f_{nn}^k = 0, f_{src(k)n}^k = 0, \forall a, b, n \in \mathcal{N}, k \in \mathcal{K} \quad (8)$$

$$f_{ab}^k = 0, \forall a, b \in \mathcal{N}, k \in \mathcal{K}, (a,b) \notin \mathcal{L}^k \quad (9)$$

$$0 \leq \beta_{n,i,l} \leq 1, i = 1, \ldots, \binom{K}{l}, l = 0, \ldots, i_n, n \in \mathcal{N} \quad (10)$$

$$\lambda_n^k \leq \sum_{b \in \mathcal{N}} f_{nb}^k - \sum_{a \in \mathcal{N}} f_{an}^k + r_n \sum_{l=0}^{i_n} \sum_{i=1}^{\binom{K}{l}} \beta_{n,i,l} 1[k \in \mathcal{B}_{n,i,l}], \quad (11)$$

$$\forall n \in \mathcal{N}, k \in \mathcal{K}, n \neq src(k)$$

$$\sum_{k \in \mathcal{K}} f_{ab}^k \leq C_{ba}/z, \forall (a,b) \in \mathcal{L} \quad (12)$$

$$\sum_{l=0}^{i_n} \sum_{i=1}^{\binom{K}{l}} \beta_{n,i,l} = 1, \forall n \in \mathcal{N} \quad (13)$$

Here, src(k) represents the content source node for data object k, and $\beta_{n,i,l}$ denotes the i-th combination of l data types out of K data types at node n, where $$i = 1, \ldots, \binom{K}{l}, l = 0, \ldots, i_n = \lfloor L_n/z \rfloor,$$

A proof of Theorem 1 can be found below.

To interpret Theorem 1, note that the flow variable f b represents the long-term VIP flow rate for data object k over link (a, b). The storage variable $\beta_{i,n,l}$ represents the long-term fraction of time that the set $\beta_{n,i,l}$ (the i-th combination of l data objects out of K data objects) is cached at node n. Inequality (11) states that the (exogenous) VIP arrival rate for data object k at node n is upper bounded by the total long-term outgoing VIP flow rate minus the total (endogenous) long-term incoming VIP flow rate, plus the long-term VIP flow rate which is absorbed by all possible caching sets containing data object k at node in, weighted by the fraction of time each caching set is used. It is believed that Theorem 1 is the first instance where the effect of caching has been fully incorporated into the stability region of a multi-hop network.

Throughput Optimality

By definition, if the VIP arrival rates $\lambda=(\lambda_n^k)_{k \in \mathcal{K}, n \in \mathcal{N}} \in int(\Lambda)$, then all VIP queues can be stabilized. In general, however, this may require knowing the value of $\lambda$. In reality, $\lambda$ can be learned only over time, and may be time-varying. Moreover, stabilizing the network given an arbitrary VIP arrival rate in the interior of A may require (time sharing among) multiple forwarding and caching policies.

It will now be shown that the joint forwarding and caching policy in Algorithm 1 adaptively stabilizes all VIP queues in the network $\mathcal{G}=(\mathcal{N}, \mathcal{L})$ for any $\lambda \in int(\Lambda)$, without knowing $\lambda$. Thus, the policy is throughput optimal, in the sense of adaptively maximizing the VIP throughput, and therefore the user demand rate satisfied by the network. In the following, it is assumed that all content sizes are the same, i.e., $z^k = z$ for all $k \in \mathcal{K}$, and that the VIP arrival processes satisfy (i) for all $n \in \mathcal{N}$ and $k \in \mathcal{K}$, $\{A_n^k(t); t=1,2,\ldots\}$ are i.i.d. with respect to t: (ii) for all in and k, $A_n^k(t) \le A_{n,max}^k$ for all t.

THEOREM 2 (THROUGHPUT OPTIMALITY). If there exists $\epsilon = (\epsilon_n^k)_{n \in \mathcal{N}, k \in \mathcal{K}} > 0$ such that $\lambda + \epsilon \in \Lambda$, (here $\epsilon > 0$ indicates $\epsilon_n^k > 0$ for all n and k), then the network of VIP queues under Algorithm 1 satisfies $$\limsup_{t \to \infty} \frac{1}{t} \sum_{\tau=1}^{t} \sum_{a \in N, k \in \mathcal{K}} \mathbb{E}[V_n^k(\tau)] \le \frac{NB}{\epsilon} \quad (14)$$

where $$B \triangleq \frac{1}{2N} \sum_{n \in N} \left( (\mu_{n,max}^{out})^2 + (A_{n,max} + \mu_{n,max}^{in} + r_{n,max})^2 + 2\mu_{n,max}^{out} r_{n,max} \right), \quad (15)$$

$$\epsilon \triangleq \min_{n \in N, k \in \mathcal{K}} \epsilon_n^k, \quad (16)$$

with $\mu_{n,max}^{in} \triangleq \Sigma_{a \in N} C_{an}/z$, $\mu_{a,max}^{out} \triangleq \Sigma_{b \in N} C_{nb}/z$, $A_{n,max} \triangleq \Sigma_{k \in \mathcal{K}} A_{n,max}^k$, and $r_{n,max} = K r_n$.

A proof of Theorem 2 can be found below.

The forwarding and caching policy in Algorithm 1 achieves throughput optimality in the virtual plane by exploiting both the bandwidth and storage resources of the network to maximally balance out the VIP load (or the demand for data objects in the network), thereby preventing the buildup of congestion. Equivalently, Algorithm 1 is throughput optimal in the actual plane when IPs are not collapsed or suppressed.

Forwarding and Caching in the Actual Plane

The development of forwarding and caching policies for the actual plane is based on the throughput optimal policies of Algorithm 1 for the virtual plane. Since there are typically a large number of VIPs in the virtual plane for a corresponding interest packet in the actual plane. Algorithm 1 can be applied in the virtual plane to explore profitable routes for forwarding and profitable node locations for caching. Forwarding and caching in the actual plane takes advantage of the exploration in the virtual plane to forward interest packets on profitable routes and cache data packets at profitable node locations.

Forwarding of Interest Packets

The forwarding of Interest Packets in the actual plane follows the pattern established by the VIPs under Algorithm 1 in the virtual plane. For a given window size T, let $$\bar{v}_{ab}^k(t) = \frac{1}{T} \sum_{t'=t-T+1}^{t} v_{ab}^k(t') \quad (17)$$

be the average number of VIPs for object k transmitted over link (a, b) over a sliding window of size T under Algorithm 1 prior to time slot t. (Note that the number $v_{ab}^k(t)$ of VIPs for object k transmitted over link (a, b) during time slot t may not be the same as the allocated transmission rate $\mu_{ab}^k(t)$. $v_{ab}^k(t)$ may be less than $\mu_{ab}^k(t)$ if there are few VIPs waiting to be transmitted.)

Forwarding: At any node $n \in \mathcal{N}$, Interest Packets for all data objects share one queue and are served on a First-Come-First-Serve basis. Suppose that the head-of-the-queue Interest Packet at node n at time t is an interest for the starting chunk of data object k. If (i) node n has not yet received a request for data object k, or if the last type-k data chunk in the last Data Packet received at node n prior to t is the ending chunk of object k, and if (ii) there is no PIT entry at node n for any chunk of data object k, then forward the Interest Packet to node $$b_n^k(t) \in \arg \max_{\{b:(n,b) \in \mathcal{L}^k\}} \bar{v}_{nb}^k(t). \quad (18)$$

That is, the Interest Packet is forwarded on the link with the maximum average object-k VIP flow rate over a sliding window of size T prior to t, under Algorithm 1. This latter link is a "profitable" link for forwarding the Interest Packet at time slot t, from the standpoint of reducing delays and congestion. If either condition (i) or (ii) does not hold, then forward the Interest Packet on the link used by node n to forward the most recent Interest Packet for a chunk of object k. (The nodes, e.g, routers, need not know the names of the starting chunk and ending chunk beforehand. These names can be learned as the nodes forward Interest Packets and receive Data Packets for the popular data objects. Before the names of the starting and ending chunks are learned, Interest Packets for the data object can be forwarded using a simple technique such as the shortest path algorithm.)

If the head-of-the-queue Interest Packet at node n at time t is an interest for a chunk of data object k which is not the starting chunk, then forward the Interest Packet on the link used by node n to forward the most recent Interest Packet for a chunk of object k.

The above forwarding algorithm ensures that a new request for data object k (which does not overlap with any ongoing request for object k) at time t is forwarded on the link with the maximum average object-k VIP flow rate over a sliding window of size T prior to t. At the same time, the algorithm ensures that an ongoing request for data object k keeps the same outgoing link from node n. This ensures that in the actual plane, all the Interest Packets for an ongoing request for data object k are forwarded on the same path toward a caching point or content source for data object k. As a direct result, the Data Packets for all chunks for the same ongoing request for data object k take the same reverse path through the network.

Note that the Interest Packets for non-overlapping requests for data object k can still be forwarded on different paths, since the quantity $b_n^k(t)$ can vary with t. Thus, the forwarding of data object requests is inherently multi-path in nature.

It can be seen that the computational complexity (per time slot) of both the averaging operation in Equation (17) and the link selection operation in Equation (18) is $O(N^2 K)$. Thus, the complexity of forwarding (per time slot) in the actual plane is $O(N^2 K)$.

Caching of Data Packets

As mentioned above, the caching algorithm in the actual plane coincides with the caching algorithm in the virtual plane. Thus, in the current context, the caching algorithm for the actual plane is the same as that described in Equation (5) (For practical implementation in the actual plane, it cannot be assumed that at each time, each node can gain access to the data object with the highest weighted VIP counts for caching. Instead, one can use a scheme similar to that discussed further below, regarding caching of data packets, based on comparing the weighted VIP count of the data object corresponding to a Data Packet received at a given node to the weighted VIP counts of the data objects currently cached at the node.)

In attempting to implement the caching policy, an oscillatory behavior is encountered. For example, since the VIP count of a data object is decremented by $r_n^k$ immediately after the caching of the object at node n, the strategy in Equation (5) exhibits oscillatory caching behavior, whereby data objects which are cached are shortly after removed from the cache again due to the VIP counts of other data objects now being larger. Thus, even though Algorithm 1 is throughput optimal in the virtual plane, its mapping to the actual plane leads to policies which are difficult to implement in practice.

Congestion Optimal VIP Control

In this section, the congestion optimal control to achieve optimal network fairness using the VIP framework is described. When the VIP arrival rates are outside the VIP network stability region $\Lambda$, i.e., $\lambda \notin \text{int}(\Lambda)$, all VIP queues cannot be stabilized. Note that for each IP for data object $k \in \mathcal{K}$, a corresponding VIP for data object $k \in \mathcal{K}$ is generated. Rather, in order to stabilize the VIP network, a controller must be placed to control the number of VIPs (and IPs) admitted into the network layer. To do this, newly arriving IPs first enter transport layer storage reservoirs before being admitted to the network layer. Transport layer VIP queues are used to store the corresponding VIPs.

Transport Layer and Network Layer VIP Dynamics

Let $Q_{n,max}^k$ and $Q_n^k(t)$ denote the transport layer VIP buffer size and the VIP count for object k at node n at the beginning of slot t, respectively. $Q_{n,max}^k$ can be infinite or finite (possibly zero; when $Q_{n,max}^k = 0$, $Q_n^k(t)=0$ for all t). Let $\alpha_n^k(t) \geq 0$ denote the amount of VIPs admitted to the network layer VIP queue of object k at node n from the transport layer VIP queue at slot t. Assume $\alpha_n^k(t) \leq \alpha_{n,max}^k$, where $\alpha_{n,max}^k$ is a positive constant which limits the burstiness of the admitted VIPs to the network layer. The following are time evolutions of the transport and network layer VIP counts:

$$Q_n^k(t+1) = \min\{(Q_n^k(t) - \alpha_n^k(t))^+ + A_n^k(t), Q_{n,max}^k\} \quad (19)$$

$$V_n^k(t+1) \leq \left(\left(V_n^k(t) - \sum_{b \in N} \mu_{nb}^k(t)\right)^+ + \alpha_n^k(t) + \sum_{a \in N} \mu_{an}^k(t) - r_n^k s_n^k(t)\right)^+ \quad (20)$$

Congestion Control Algorithm

The goal of the congestion control is to support a portion of the VIPs which maximizes the sum of utilities when $\lambda \notin \Lambda$. Let $g_n^k(\cdot)$ be the utility function associated with the VIPs admitted into the network layer for object k at node it. Assume $g_n^k(\cdot)$ is non-decreasing and concave, and for purposes here, continuously differentiable and non-negative. Unlike previous congestion control algorithms which all focus on maintaining fairness among different source-destination communication rates, the congestion control algorithms below are the first to maintain fairness among different request-specific data objects. That is, the algorithms maintain fairness between different requester-specific content.

Define a $\theta$-optimal admitted VIP rate as follows:

$$\overline{\alpha}^*(\theta) = \arg\max_{\overline{\alpha}} \sum_{n \in N, k \in \mathcal{K}} g_n^k(\overline{\alpha}_n^k) \quad (21)$$

$$\text{s.t. } \overline{\alpha} + \theta \in \Lambda \quad (22)$$

$$0 \leq \overline{\alpha} \leq \lambda \quad (23)$$

where $\overline{\alpha}^*(\theta) = (\overline{\alpha}_n^{k*}(\theta))$, $\overline{\alpha} = (\overline{\alpha}_n^k)$ and $0 \leq \theta = (\theta_n^k) \in \Lambda$. The constraint in Equation (22) ensures that the admitted rate to the network layer is bounded away from the boundary of the network stability region by $\theta$. Due to the non-decreasing property of the utility functions, the maximum sum utility over all $\theta$ is achieved at $\overline{\alpha}^*(0)$ when $\theta=0$.

It will be appreciated that any utility function meeting the criteria of non-decreasing and concave can be used. Examples include, without limitation, $\alpha$-fairness, logarithmic, and arctangent utility functions. An $\alpha$-fairness utility function is described, for example, in J. Mo. and J. Walrand, Fair end-to-end window-based congestion control. IEEE/ACM Trans. Networking, vol. 8, no. 5, pp. 556-567, October 2000.

In the following, a joint congestion control, forwarding and caching algorithm is developed that yields a throughput vector which can be arbitrarily close to the optimal solution $\overline{\alpha}^*(0)$. Auxiliary variables $\gamma_n^k(t)$ and the virtual queues $Y_n^k(t)$ for all $n \in \mathcal{N}$ and $k \in \mathcal{K}$ are introduced.

ALGORITHM 2. Initialize the virtual VIP count $Y_n^k(0)=0$ for all $n \in \mathcal{N}$ and $k \in \mathcal{K}$. At the beginning of each time slot t, observe the network layer VIP counts $(V_n^k(t))_{k \in \mathcal{K}, n \in \mathcal{N}}$ and virtual VIP counts $(Y_n^k(t))_{k \in \mathcal{K}, n \in \mathcal{N}}$, and perform the following congestion control, forwarding and caching in the virtual plane:

Congestion Control: For each node n and object k, choose the admitted VIP count at slot t, which also serves as the output rate of the corresponding virtual queue:

$$\alpha_n^k(t) = \begin{cases} \min\{Q_n^k(t), \alpha_{n,max}^k\}, & Y_n^k(t) > V_n^k(t) \\ 0, & \text{otherwise} \end{cases}$$

Then, choose the auxiliary variable, which serves as the input rate to the corresponding virtual queue:

$$\gamma_n^k(t) = \arg\max_{\gamma} Wg_n^k(\gamma) - Y_n^k(\gamma) \quad (24)$$

$$\text{s.t. } 0 \leq \gamma \leq \alpha_{n,max}^k$$

where $W>0$ is a control parameter which affects the utility-delay tradeoff of the algorithm. Based on the chosen $\alpha_n^k(t)$ and $\gamma_n^k(t)$, the transport layer VIP count is updated according to Equation (19) and the virtual VIP count is updated according to:

$$Y_n^k(t+1) = (Y_n^k(t) - \alpha_n^k(t))^+ + \gamma_n^k(t) \quad (25)$$

Forwarding and Caching: Same as Algorithm 1 above. The network layer VIP count is updated according to Equation (20).

Utility Delay Tradeoff

It is now shown that for any control parameter $W>0$, the joint congestion control, forwarding and caching policy in Algorithm 2 adaptively stabilizes all VIP queues in the network $\mathcal{G} = (\mathcal{N}, \mathcal{L})$ for any $\lambda \notin \text{int}(\Lambda)$, without knowing $\lambda$. Algorithm 2 yields a throughput vector which can be arbitrarily close to the optimal solution $\overline{\alpha}^*(0)$ by letting $W \to 0$. Similarly, in the following, it is assumed that all content sizes are the same, i.e., $z^k = z$ for all $k \in \mathcal{K}$, and that the VIP arrival processes satisfy (i) for all $n \in \mathcal{N}$ and $k \in \mathcal{K}$, $\{A_n^k(t); t=1, 2, \ldots\}$ are i.i.d. with respect to t; (ii) for all n and k, $A_n^k(t) \leq A_{n,max}^k$ for all t.

THEOREM 3 (UTILITY-DELAY TRADEOFF OF ALGORITHM 2) For an arbitrary VIP arrival rate A and for any control parameter W>0, the network of VIP queues under Algorithm 2 satisfies $$\lim_{t\to\infty} \sup \frac{1}{t} \sum_{\tau=1}^{t} \sum_{n\in N, k\in \mathcal{K}} \mathbb{E}\left[V_n^k \le \frac{2N(\tau)\tilde{B} + WG_{max}}{2\ell}\right] \quad (26)$$

$$\lim_{t\to\infty} \inf \sum_{n\in N, k\in \mathcal{K}} g_n^k(\overline{\alpha}_n^k(t)) \ge \sum_{n\in N, k\in \mathcal{K}} g_n^{(\alpha)}(\overline{\alpha}_n^{k*}(0)) - \frac{2N\hat{B}}{W} \quad (27)$$

$$\hat{B} \triangleq \frac{1}{2N} \sum_{n\in N} \left((\mu_{n,max}^{out})^2 + (\alpha_{n,max} + \mu_{n,max}^{in} + r_{n,max})^2 + 2\mu_{n,max}^{out} r_{n,max}\right) \quad (28)$$

$$\hat{e} \triangleq \sup_{\{ac\in A\}} \min_{n\in N, k\in \mathcal{K}} \{c_n^k\} \quad (29)$$

with $\alpha_{n,max} \triangleq \Sigma_{k\in \mathcal{K}} \alpha_{n,max}^k$, $G_{max} \triangleq \Sigma_{n\in N, k\in \mathcal{K}} g_n^k(\alpha_{n,max}^k)$ $$\overline{\alpha}_n^k(t) \triangleq \frac{1}{t} \sum_{\tau=1}^{t} \mathbb{E}[\alpha_n^k(\tau)].$$

The Proof of Theorem 3 is below.

A Stable Caching VIP Algorithm

In this section, another embodiment of the VIP framework is provided yielding a forwarding and caching policy for the actual plane that has a more stable caching behavior. A practical VIP algorithm is described, called Algorithm 3, that looks for a stable solution in which the cache contents do not cycle in steady-state. Although Algorithm 3 is not theoretically optimal in the virtual plane, it can be shown that it leads to significant performance gains in simulation experiments. The algorithm uses VIPs to explore potential routes and node locations for caching. This exploration in the virtual plane is then exploited to direct the forwarding and caching of real IPs in the actual plane to achieve good performance.

Forwarding of Interest Packets

The forwarding algorithm in the virtual plane for Algorithm 3 coincides with the backpressure-based forwarding scheme described in Equations (2)-(3) for Algorithm 1. The forwarding of Interest Packets in the actual plane for Algorithm 3 coincides with the forwarding scheme described in Equation (17). That is, all the Interest Packets for a particular request for a given data object are forwarded on the link with the maximum average VIP flow rate over a sliding window of size T prior to the arrival time of the Interest Packet for the first chunk of the data object.

Caching of Data Packets

The caching decisions are based on the VIP flow in the virtual plane. Suppose that at time slot t, node in receives the Data Packet containing the first chunk of data object $k_{new}$ which is not currently cached at node n. If there is sufficient unused space in the cache of node n to accommodate the Data Packets of all chunks of object $k_{new}$, then node n proceeds to cache the Data Packet containing the first chunk of data object $k_{new}$ as well as the Data Packets containing all subsequent chunks for data object $k_{new}$ (which, by the forwarding algorithm described above, all take the same reverse path through node in). That is, the entire data object k is cached at node n. Otherwise, the node compares the cache scores for $k_{new}$ and the currently cached objects, as follows. For a given window size T, let the cache score for object k at node n at time t be $$CS_n^k(t) = \frac{1}{T} \sum_{t'=t-T+1}^{t} \sum_{(a,n)\in \mathcal{L}^k} v_{an}^k(t') = \sum_{(a,n)\in \mathcal{L}^k} \overline{v}_{an}^k(t), \quad (30)$$

i.e., the average number of VIPs for object k received by node n over a sliding window of size T prior to time slot t. Let $\mathcal{K}_{n,old}$ be the set of objects that are currently cached at node n.

To determine the new caching configuration, for each $n\in \mathcal{N}$, let $(k_1, k_2, \ldots, k_{|\mathcal{K}_{n,old}|+1})$ be a permutation of $(1, 2, \ldots, K)$ such that $CS_n^{k1}(t)/z^{k1} > CS_n^{k2}(t)/z^{k2} \ge \ldots \ge CS_n^{k_{|\mathcal{K}_{n,old}|+1}}(t)/z^{k_{|\mathcal{K}_{n,old}|+1}}$. Let $$i_n = \max_i \le \mathcal{K}_{n,old} + 1 \text{ such that } \sum_{l=1}^{i} z^{kl} \le L_n$$

Then for each $n\in \mathcal{N}$, choose $$s_n^k(t) = \begin{cases} 1, & k \in \{k_1, \ldots, k_{i_n}\} \\ 0, & \text{otherwise} \end{cases} \quad (5)$$

Thus, the objects with the highest weighted cache scores are cached.

At each time t, the VIP count at node n for object k is decreased by $r_n s_n^k(t)$ due to the caching at node n. This has the effect of attracting the flow of VIPs for each object $k\in \mathcal{K}_{n,new}$, where $\mathcal{K}_{n,new}$ denotes the new set of cached objects, to node n.

The Data Packets for data objects evicted from the cache are potentially cached more efficiently elsewhere (where the demand for the evicted data object is relatively bigger). This is realized as follows: before the data object is evicted, VIPs and Interest Packets flow toward the caching point as it is a sink for the object. After eviction, the VIP count would begin building up since the VIPs would not exit at the caching point. As the VIPs build further, the backpressure load-balancing forwarding policy would divert them away from the current caching point to other parts of the network.

The caching complexity for Algorithm 3 is found as follows. Note that the complexity of calculating the cache scores (per time slot) in Equation (30) is $O(N^2K)$. Due to link capacity constraints, the number of new data objects which arrive at a given node in a time slot is upper bounded by a constant. Thus, for fixed cache sizes, the total computational complexity for the cache replacement operation (per time slot) is $O(N)$. In sum, the caching complexity for Algorithm 2 per time slot is $O(N^2K)$.

Experimental Evaluation

Figure 2:
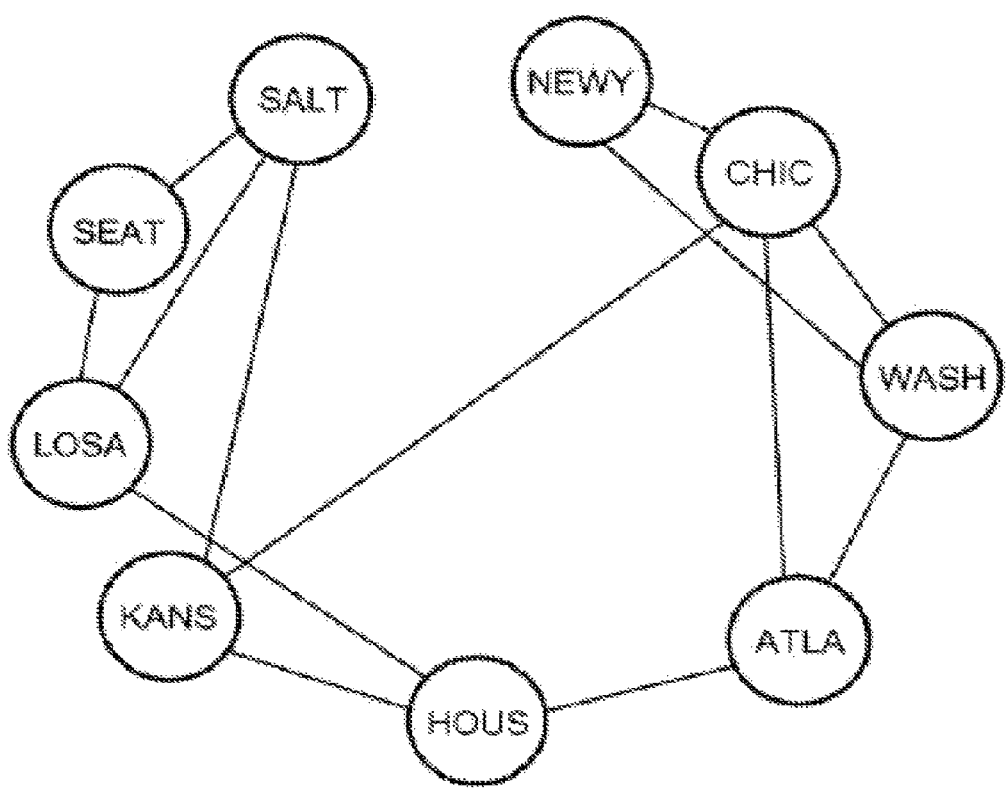
FIG. 2 is a schematic illustration of an Abilene Network.
Figure 3:
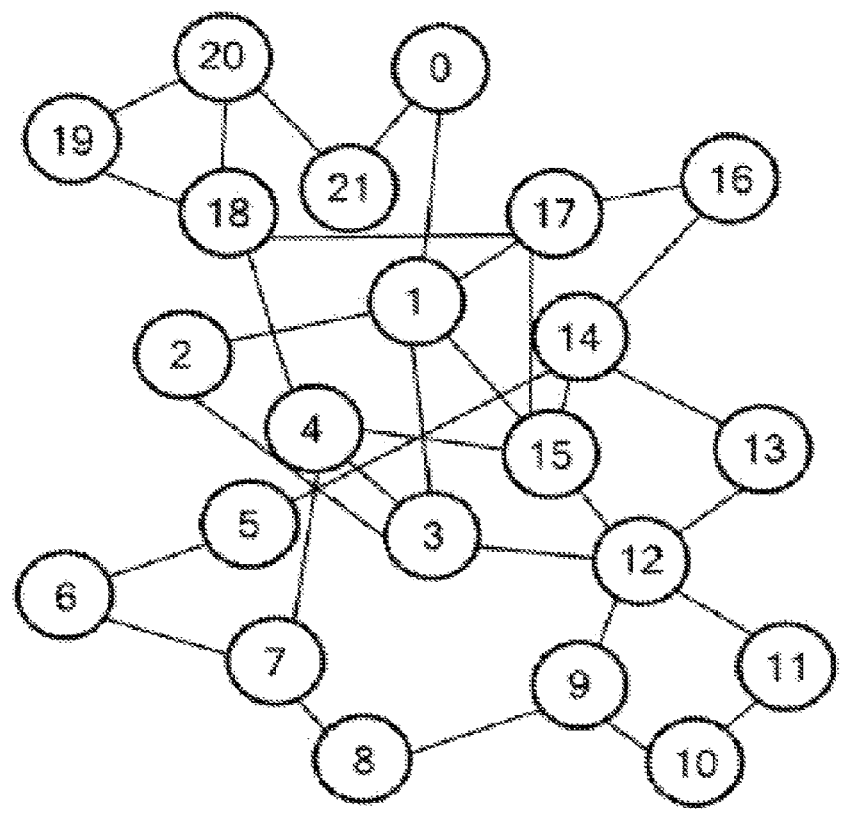
FIG. 3 is a schematic illustration of a GEANT Network.
Figure 4:
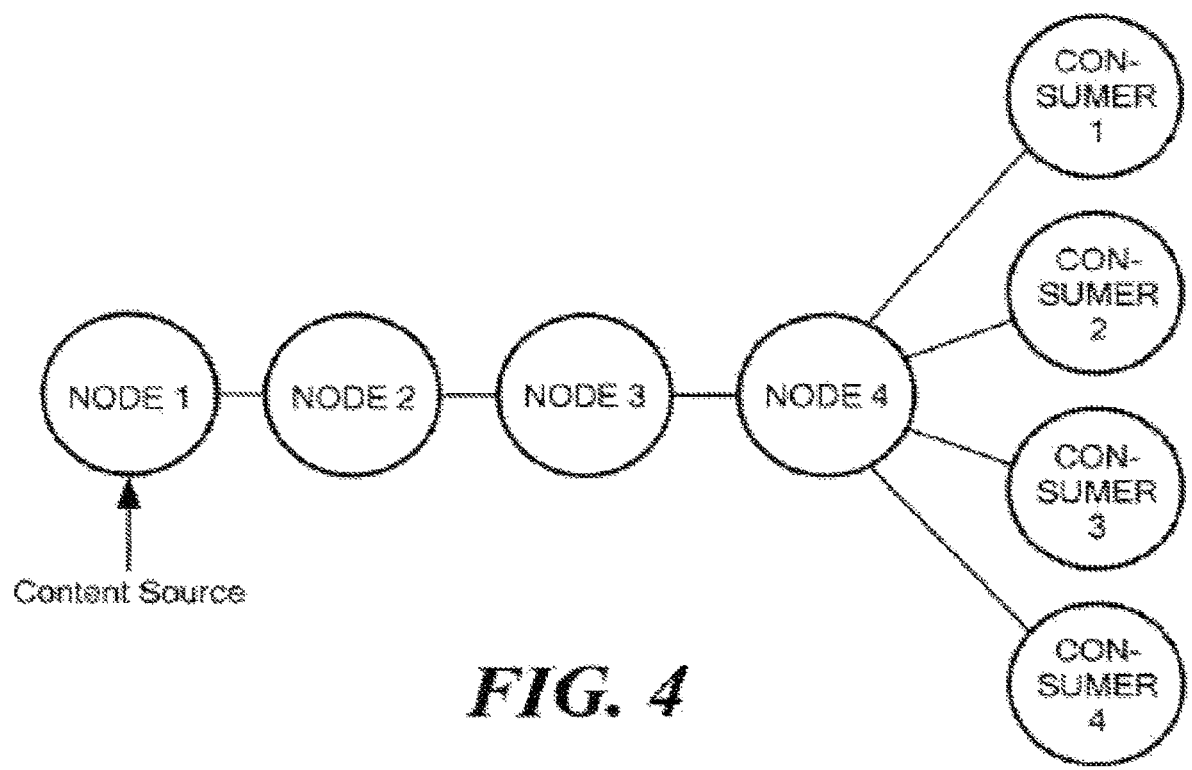
FIG. 4 is a schematic illustration of a Service Network.
Figure 5:
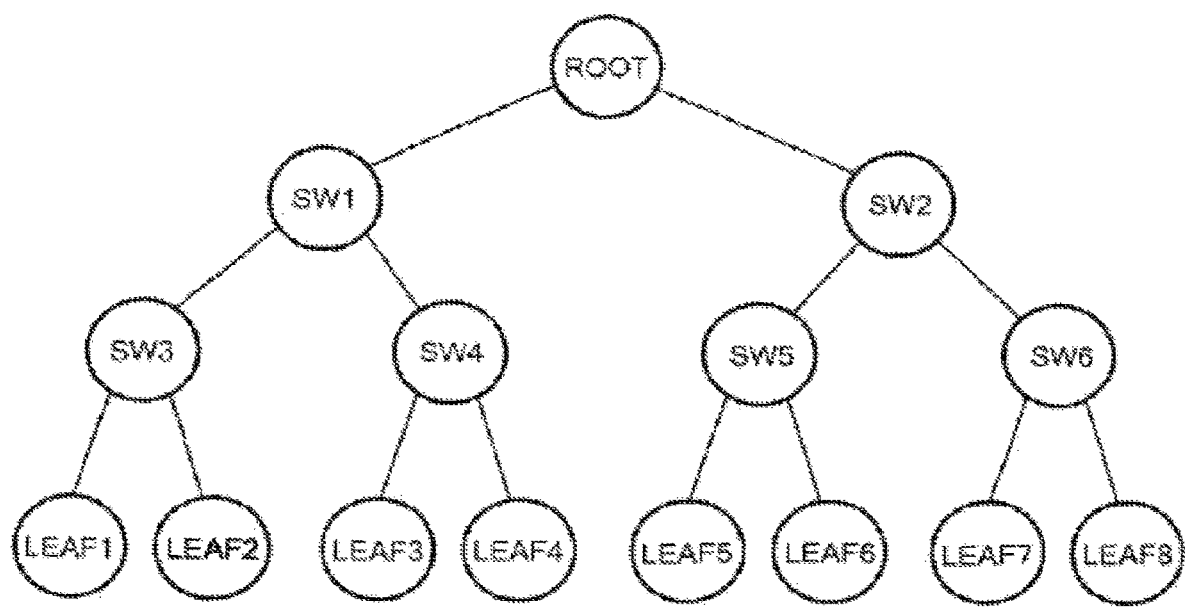
FIG. 5 is a schematic illustration of a Tree Network.
Figure 6:
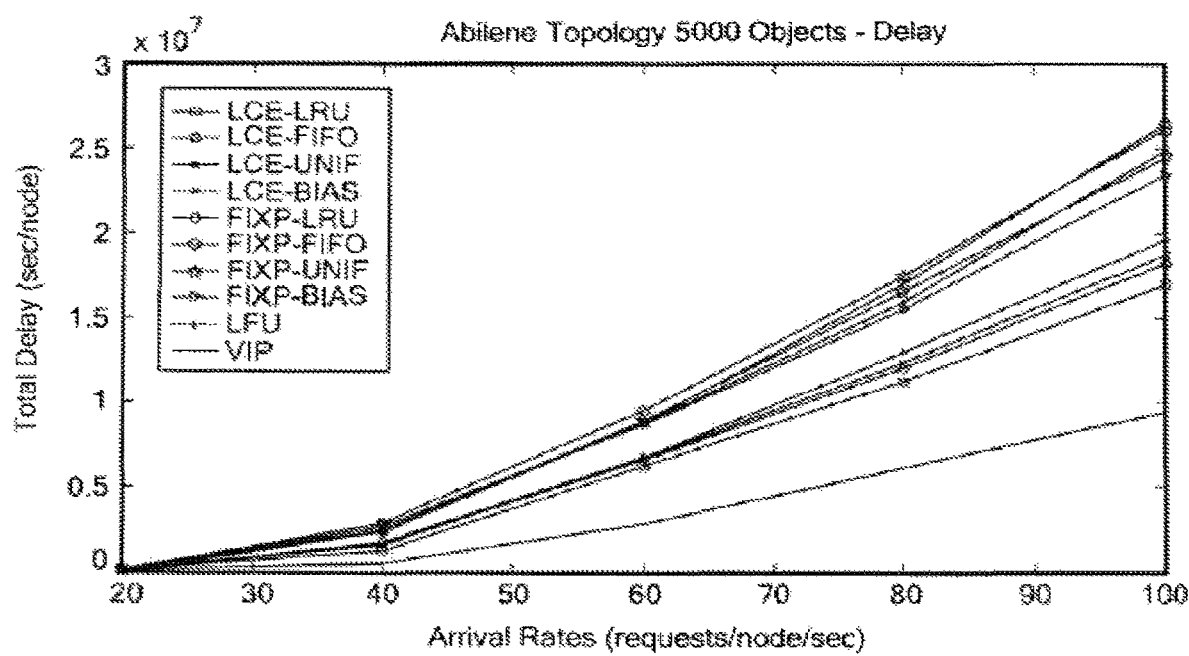
FIG. 6 illustrates a graph of delay vs. request arrival rates for the Abilene Network generated in an experimental comparison of the Stable Caching VIP Algorithm of the present invention against known baseline routing and caching policies.
Figure 7:
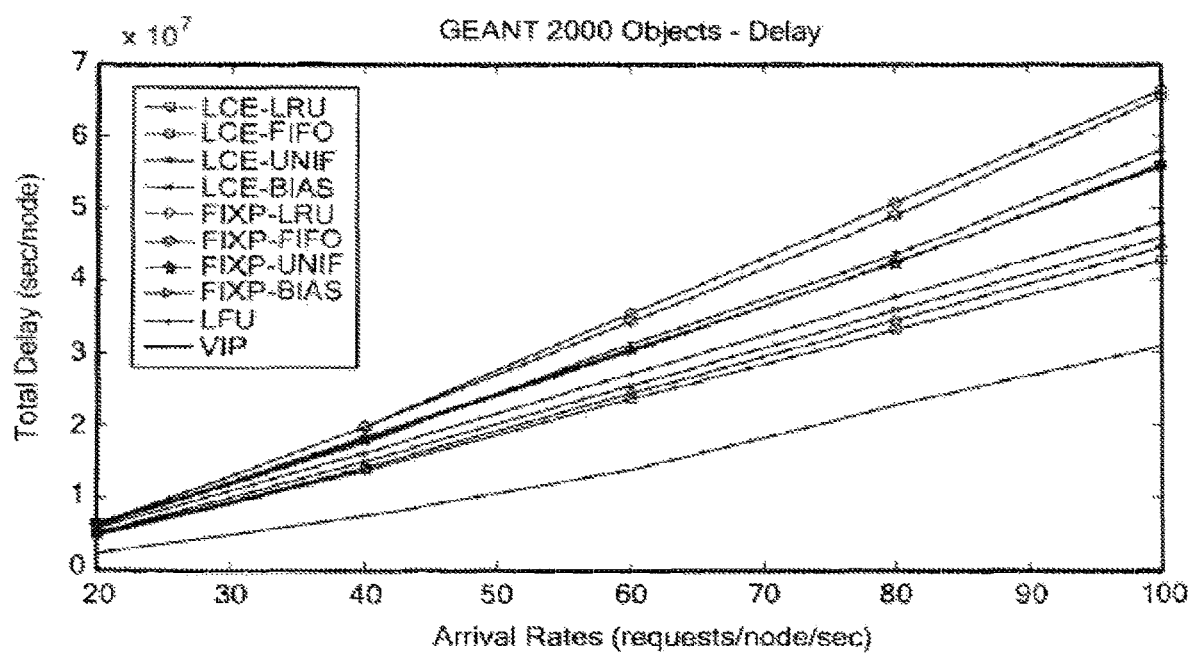
FIG. 7 illustrates a graph of delay vs. request arrival rates for the GEANT Network generated in an experimental comparison of the Stable Caching VIP Algorithm of the present invention against known baseline routing and caching policies.
Figure 8:
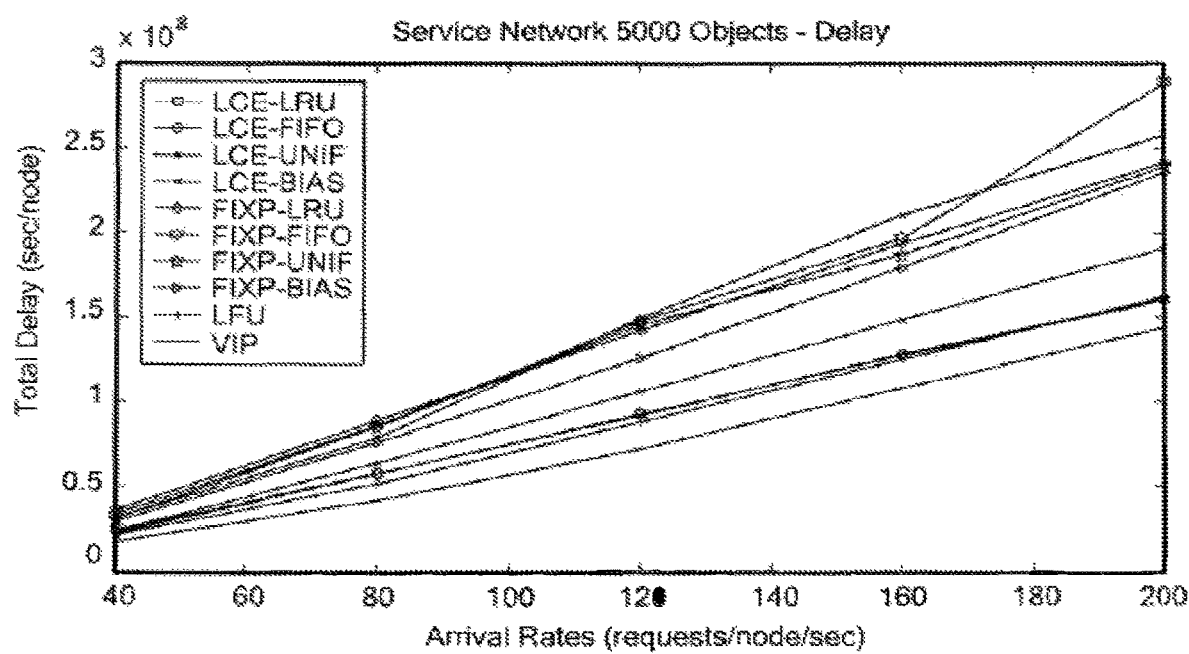
FIG. 8 illustrates a graph of delay vs. request arrival rates for the Service Network generated in an experimental comparison of the Stable Caching VIP Algorithm of the present invention against known baseline routing and caching policies.
Figure 9:
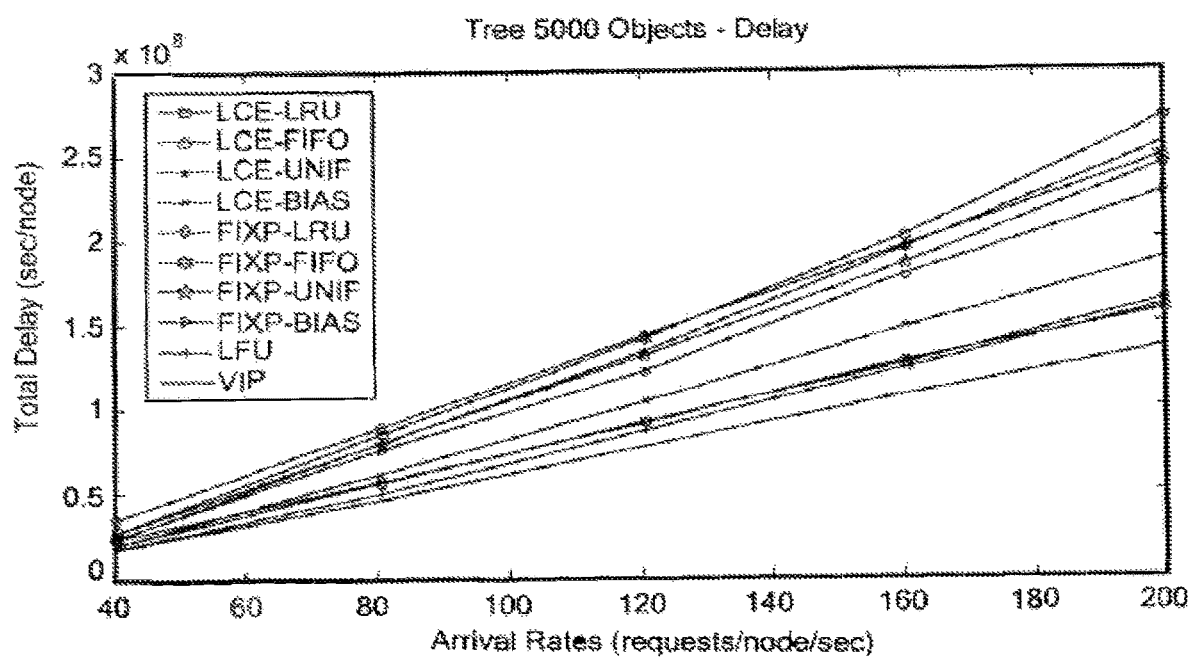
FIG. 9 illustrates a graph of delay vs. request arrival rates for the Tree Network generated in an experimental comparison of the Stable Caching VIP Algorithm of the present invention against known baseline routing and caching policies.
Figure 10:
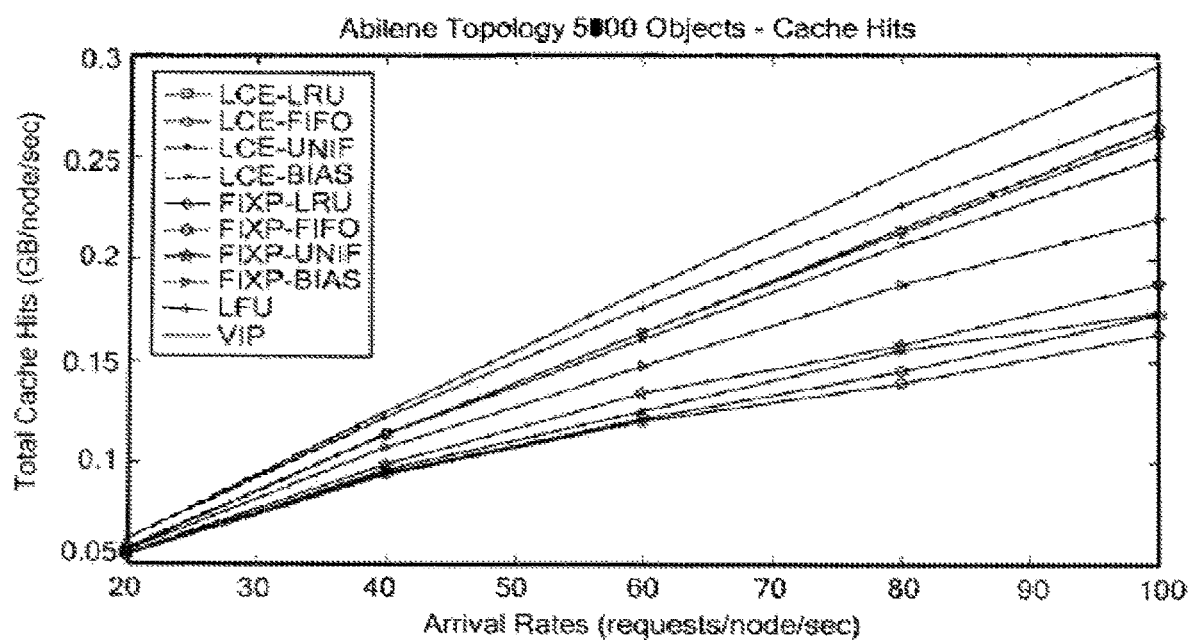
FIG. 10 illustrates a graph of total cache hits vs. request arrival rates for the Abilene Network generated in an experimental comparison of the Stable Caching VIP Algorithm of the present invention against known baseline routing and caching policies.
Figure 11:
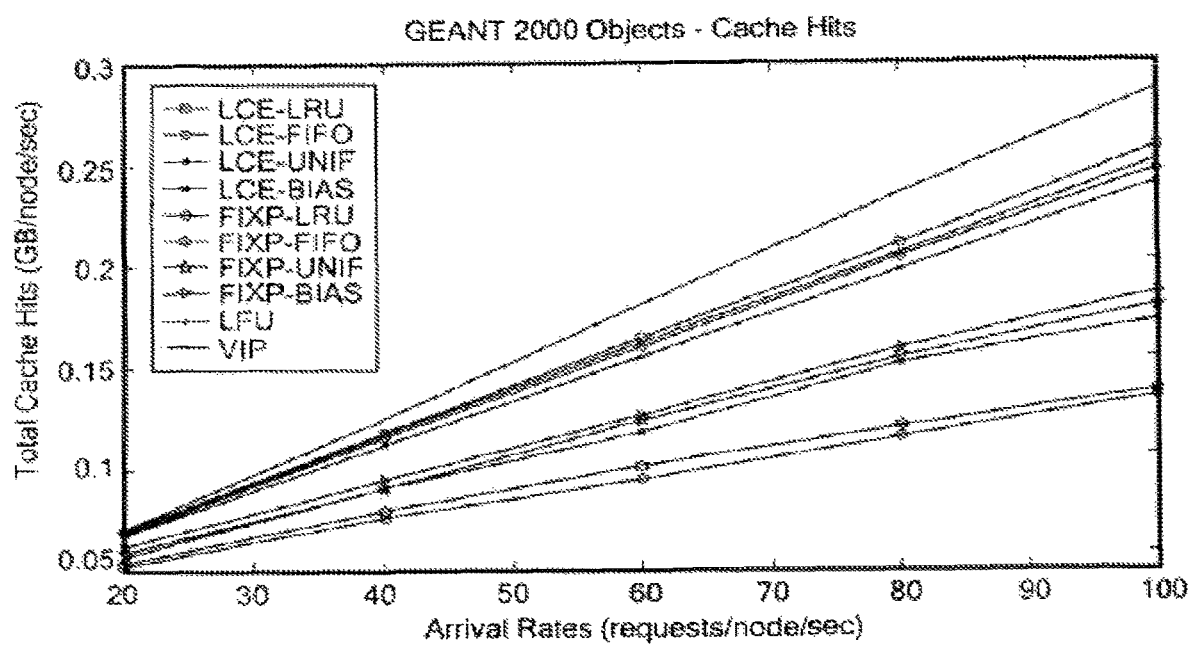
FIG. 11 illustrates a graph of total cache hits vs. request arrival rates for the GEANT Network generated in an experimental comparison of the Stable Caching VIP Algorithm of the present invention against known baseline routing and caching policies.
Figure 12:
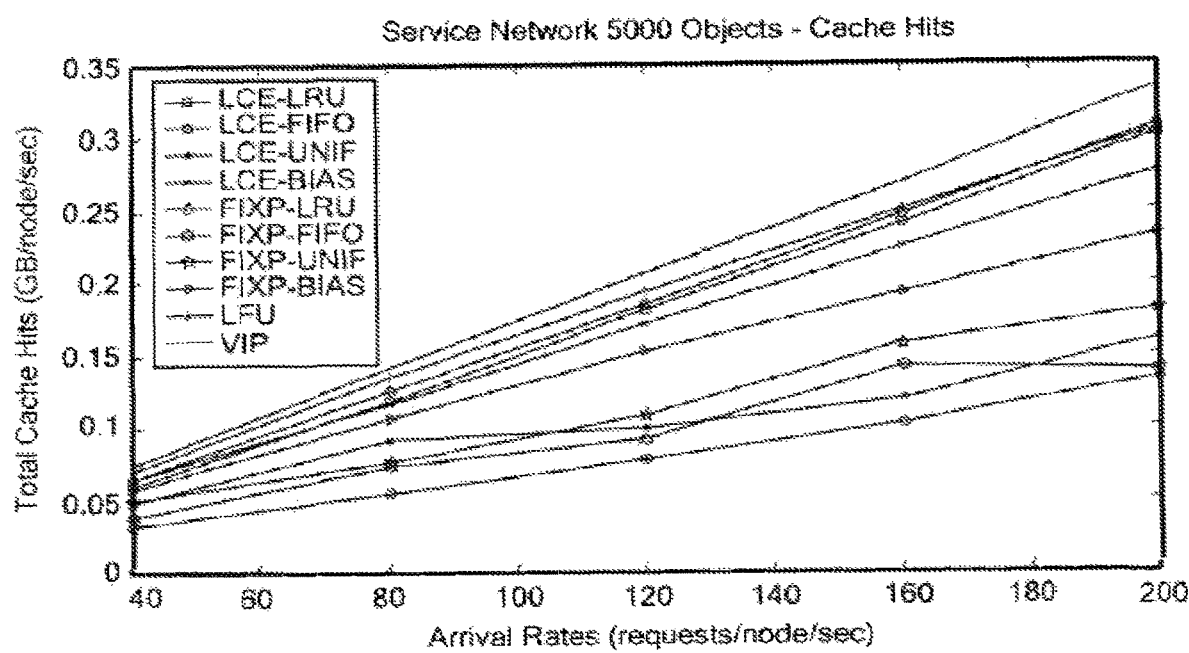
FIG. 12 illustrates a graph of total cache hits vs. request arrival rates for the Service Network generated in an experimental comparison of the Stable Caching VIP Algorithm of the present invention against known baseline routing and caching policies.
Figure 13:
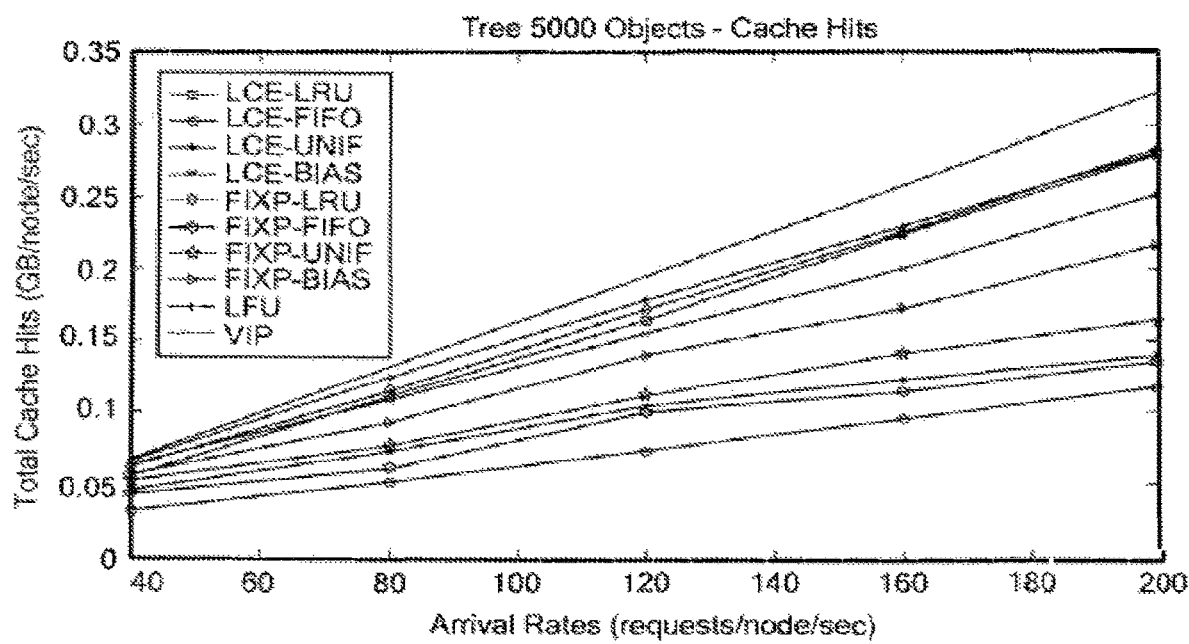
FIG. 13 illustrates a graph of total cache hits vs. request arrival rates for the Tree Network generated in an experimental comparison of the Stable Caching VIP Algorithm of the present invention against known baseline routing and caching policies.

This section presents the experimental evaluation of the Stable Caching VIP Algorithm (Algorithm 3). (The simulations were carried out on a computer with dual Intel E5 2650 CPUs (2.60 GHz) and 128 GB RAM space.) Superior performance of the proposed algorithm is demonstrated in terms of low user delay and high rate of cache hits, relative to baseline routing and caching policies. Experimental scenarios are carried out on four network topologies: the Abilene Topology in FIG. 2, the GEANT topology in FIG. 3, the Service Network topology in FIG. 4, and the Tree Topology in FIG. 5.

In the Tree, Service Network, and Abilene topologies, all link capacities are chosen to be 500 Mb/s. In the GEANT topology, all link capacities are chosen to be 200 Mb/s. The Interest Packet size is 125 B; the Data Packet size is 50 KB; the data object size is 5 MB. At each node requesting data, object requests arrive according to a Poisson process with an overall rate $\lambda$ (in requests/node/sec). Each arriving request requests data object k (independently) with probability $p_k$, where $\{p_k\}$ follows a (normalized) Zipf distribution with parameter 0.75. It is assumed that each object request requests the whole object, with the corresponding Interest Packets generated in order. In the GEANT topology, a total of 2000 data objects are considered, while in the other topologies (Tree, Service Network and Abilene), 5000 data objects are considered. The buffers which hold the Interest and Data Packets at each node are assumed to have infinite size. We do not consider PIT expiration timers and interest retransmissions.

In the Abilene and GEANT topologies, object requests can be generated by any node, and the content source node for each data object is independently and uniformly distributed among all nodes. The cache sizes at all nodes are identical, and are chosen to be 5 GB (1000 data objects) in the Abilene topology and 2 GB (400 data objects) in the GEANT topology. In the Service Network topology, NODE 1 is the content source for all objects and requests can be generated only by the CONSUMER nodes. The cache sizes at NODE 2, NODE 3, NODE 4 and the CONSUMER nodes are 5 GB. In the Tree Network topology, the ROOT node is the content source for all data objects. Cache sizes on the other nodes are chosen to be 5 GB.

In the virtual plane, the slot length is 200 msec in the GEANT topology and 80 msec in the other topologies. Forwarding uses the backpressure algorithm with a cost bias to help direct VIPs toward content source nodes. (It can be shown that the cost-biased version is also through-put optimal in the virtual plane, as in Theorem 2.) The cost bias is calculated as the number of hops on the shortest path to the content source, and is added to the VIP queue differential. In the actual plane, the time step for forwarding and caching decisions is 5 μsec in the GEANT topology and 2 μsec in the other topologies, i.e., the transmission time of one Interest Packet. The window size T is 5000 slots. Each simulation generates requests for 100 see and terminates when all Interest Packets are fulfilled. Each curve in FIGS. 6-13 is obtained by averaging over 10 simulation runs.

Simulation experiments were carried out to compare the Stable Caching VIP Algorithm against a number of popular caching algorithms used in conjunction with shortest path routing. Each caching algorithms consists of two parts: caching decision and caching replacement. Caching decision decides whether or not to cache a new data object when the first chunk of this object arrives and there is no remaining cache space. If a node decides to cache the new data object, then caching replacement decides which currently cached data object should be evicted to make room for the new data object. The following caching decision policies were considered: (i) Leave Copies Everywhere (LCE), which decides to cache all new data objects and (ii) FIXP, which decides to cache each new data object (independently) according to a fixed probability (0.75 in these experiments). The following caching replacement policies were considered: (i) Least Recently Used (LRU), which replaces the least recently requested data object, (ii) First In First Out (FIFO), which replaces the data object which arrived first to the cache; (iii) UNIF, which chooses a currently cached data object for replacement, uniformly at random, and (iv) BIAS, which chooses two currently cached data objects uniformly at random, and then replaces the less frequently requested one. In addition, Least Frequently Used (LFU) was considered. In LFU, the nodes record how often each data object has been requested and choose to cache the new data object if it is more frequently requested than the least frequently requested cached data object (which is replaced).

The delay for an Interest Packet request is the difference between the fulfillment time (i.e., time of arrival of the requested Data Packet) and the creation time of the Interest Packet request. A cache hit for a data chunk is recorded when an Interest Packet reaches a node which is not a content source but which has the data chunk in its cache. When a cache hit occurs, the corresponding metric is incremented by the size of the chunk in cache.

FIGS. 6-9 show the delay performance of the algorithms. It is clear that the Stable Caching VIP Algorithm significantly outperforms all other algorithms tested. For instance, for the Abilene topology at $\lambda=100$ requests/node/sec, the total delay for the VIP algorithm is only 55% of the delay for the closest competitor (LCE-LRU), and only about 36% of the delay for the worst performing algorithm (LCE-FIFO). It is worthwhile to note that the delay advantage for the Stable Caching VIP Algorithm is more significant for the Abilene and GEANT topologies, where the availability of multiple paths for forwarding allows the advantages of the VIP algorithm to be more fully realized.

FIGS. 10-13 show the cache hit performance for the algorithms. Again, the Stable Caching VIP Algorithm has significantly higher total cache hits than other algorithms. For the Service topology at $\lambda=200$ requests/node/sec, the total number of cache hits for Algorithm 3 is about 12% higher than that for the closest competitor (LCE-LRU) and is more than 2 times the number of cache hits for the worst performing algorithm (LCE-FIFO). In sum, the Stable Caching VIP Algorithm significantly outperforms all competing algorithms tested, in terms of user delay and rate of cache hits The joint design of traffic engineering and caching strategies is central to information-centric architectures such as NDN, which seek to optimally utilize both bandwidth and storage for efficient content distribution. In this work, the VIP framework for the design of high performing NDN networks is introduced. In the virtual plane of the VIP framework, distributed control algorithms operating on virtual interest packets (VIPs) are developed to maximize user demand rate satisfied by the network. The flow rates and queue lengths of the VIPs are then used to specify the forwarding and caching algorithms in the actual plane, where Interest Packets and Data Packets are processed. Experimental results show that the latter set of algorithms have superior performance in terms of user delay and cache hit rates, relative to baseline routing and caching policies.

Figure 14:
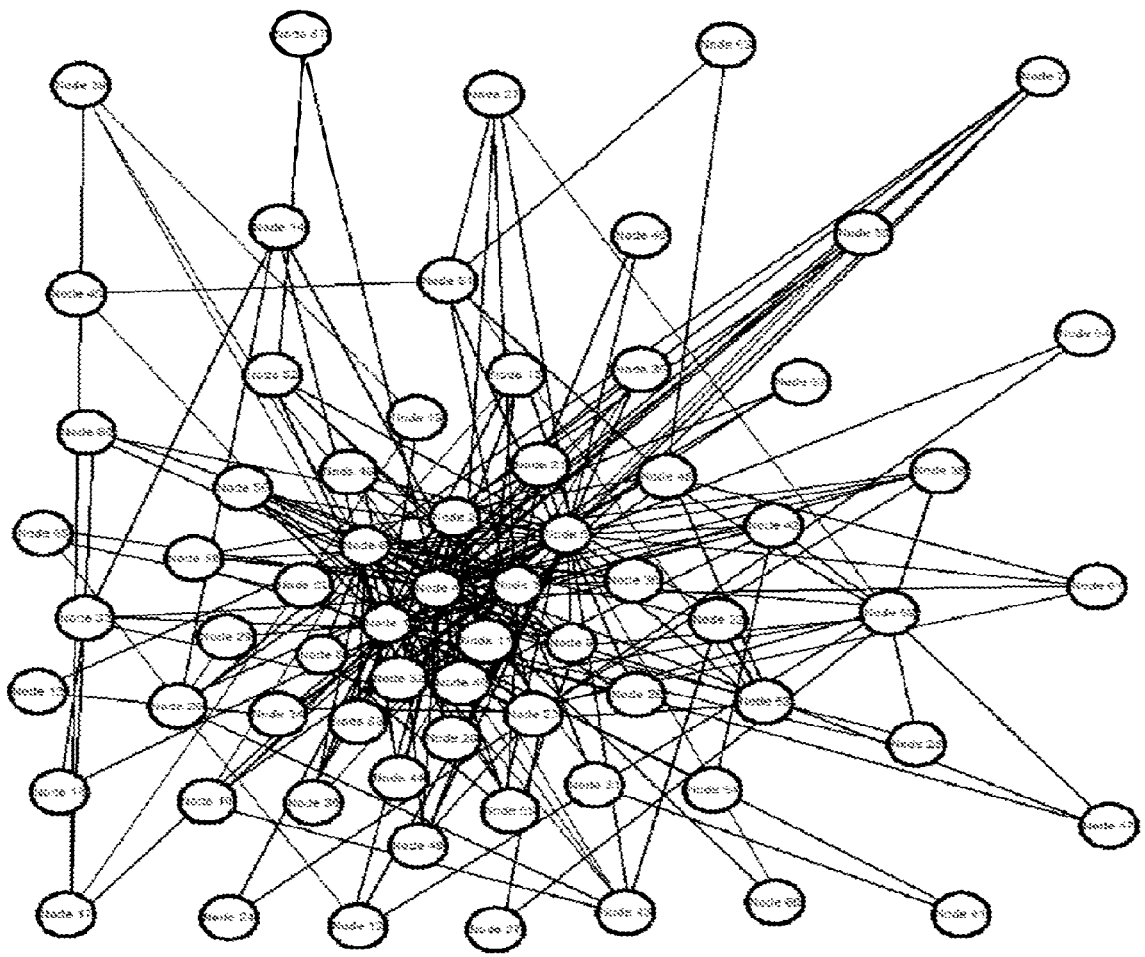
FIG. 14 is a schematic illustration of a DTelekom Network.
Figure 15:
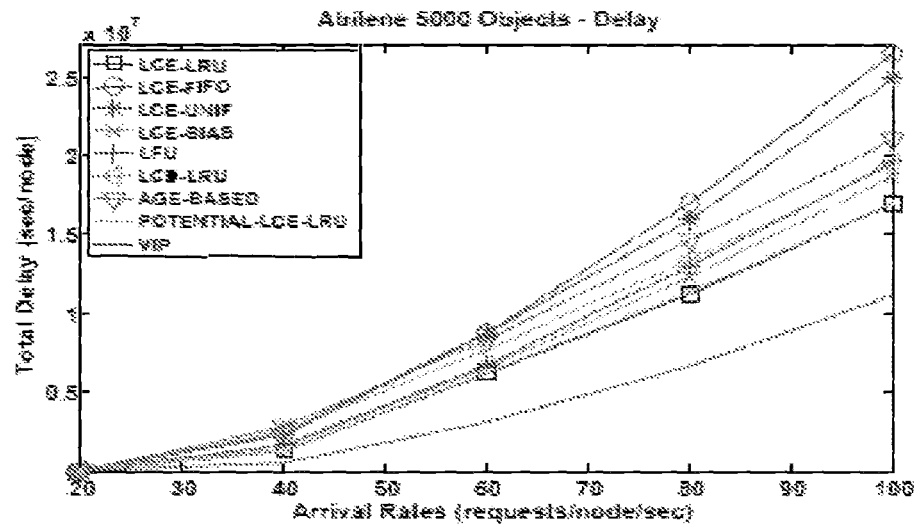
FIG. 15 illustrates a graph of delay vs. request arrival rates for the Abilene Network generated in a further experimental comparison.
Figure 16:
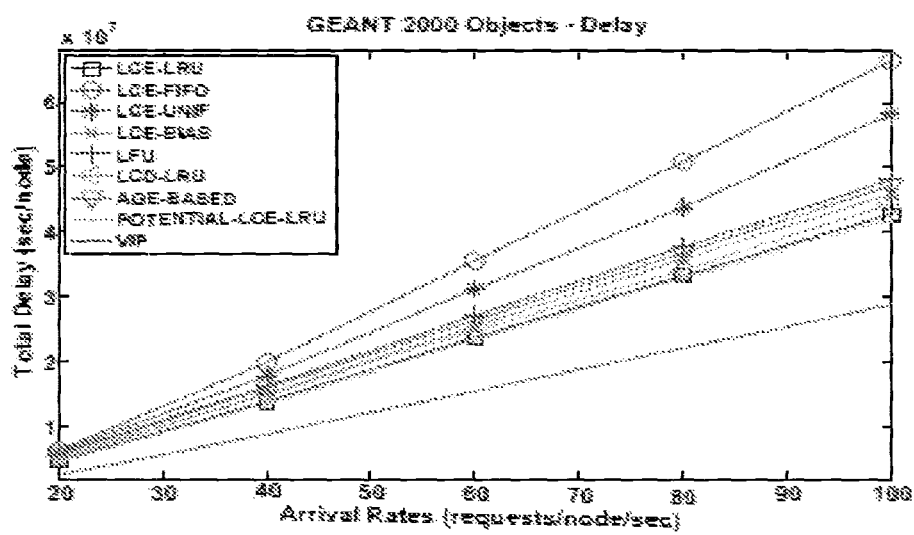
FIG. 16 illustrates a graph of delay vs. request arrival rates for the GEANT Network generated in the further experimental comparison.
Figure 17:
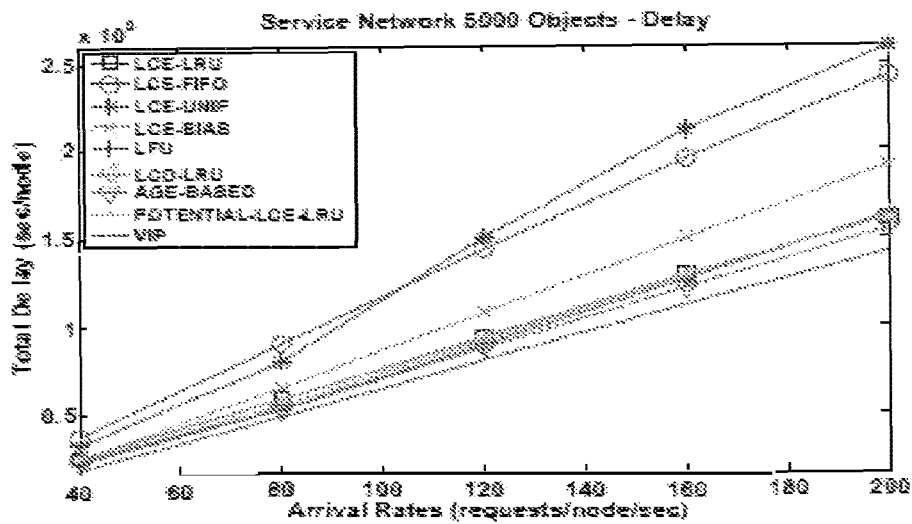
FIG. 17 illustrates a graph of delay vs. request arrival rates for the Service Network generated in the further experimental comparison.
Figure 18:
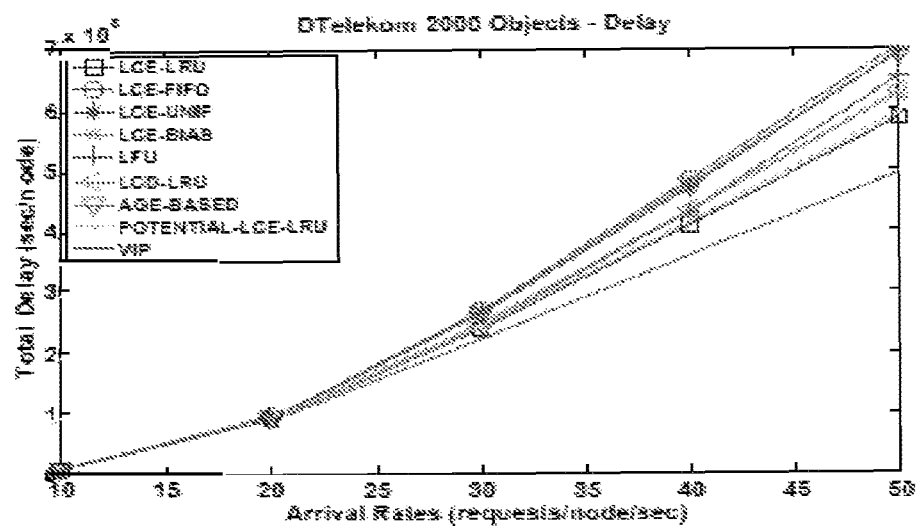
FIG. 18 illustrates a graph of delay vs. request arrival rates for the DTelekom Network generated in the further experimental comparison.
Figure 19:
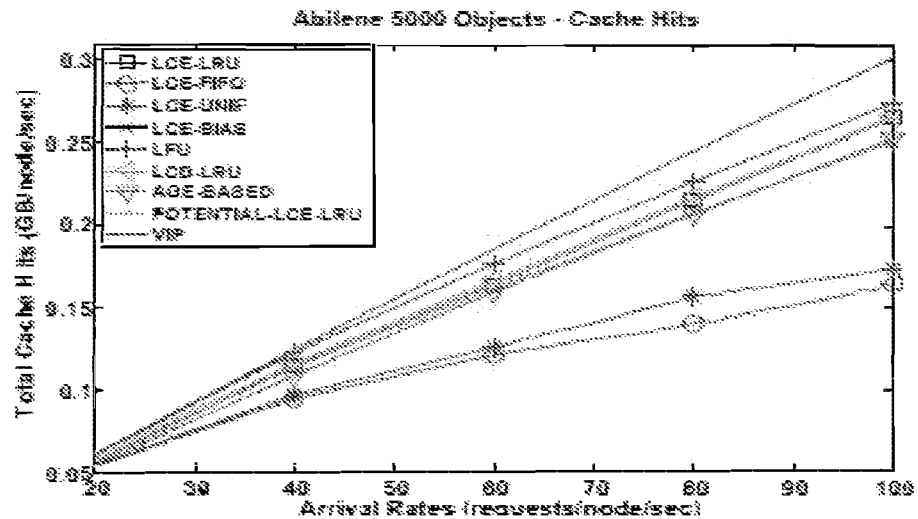
FIG. 19 illustrates a graph of total cache hits vs. request arrival rates for the Abilene Network generated in the further experimental comparison.
Figure 20:
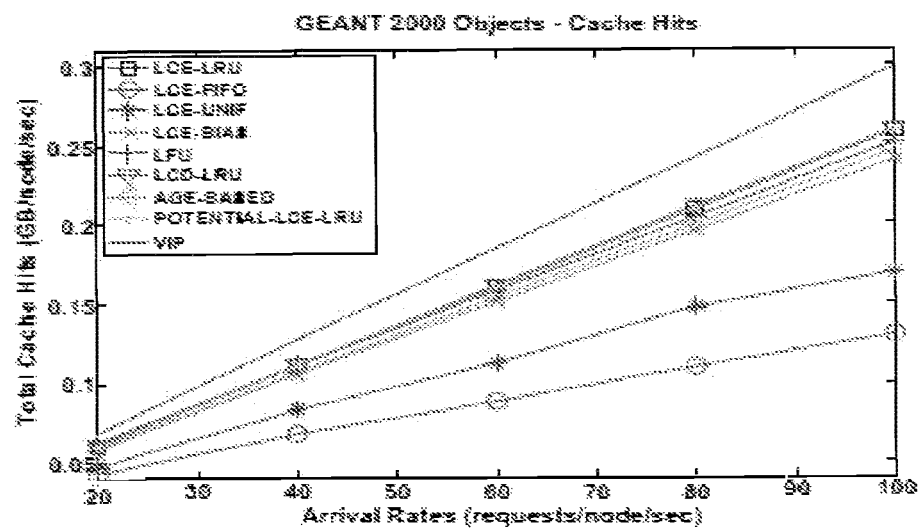
FIG. 20 illustrates a graph of total cache hits vs. request arrival rates for the GEANT Network generated in the further experimental comparison.
Figure 21:
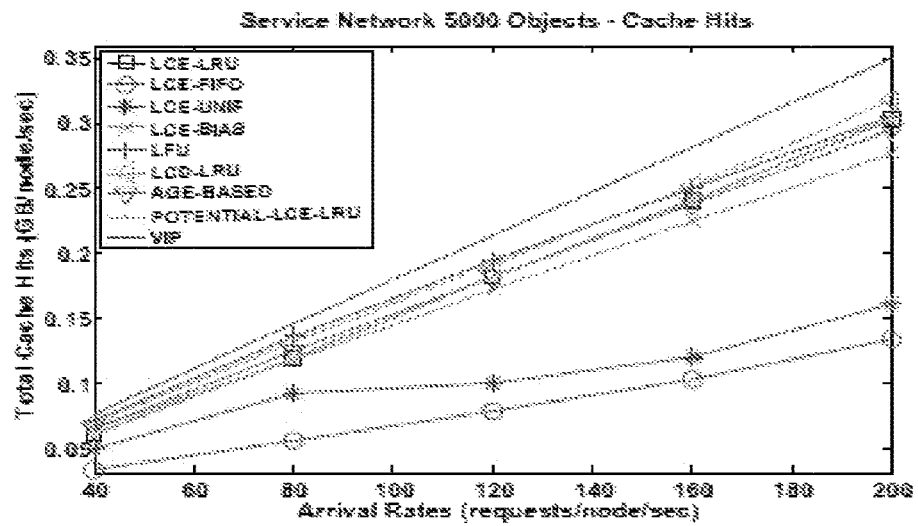
FIG. 21 illustrates a graph of total cache hits vs. request arrival rates for the Service Network generated in the further experimental comparison.
Figure 22:
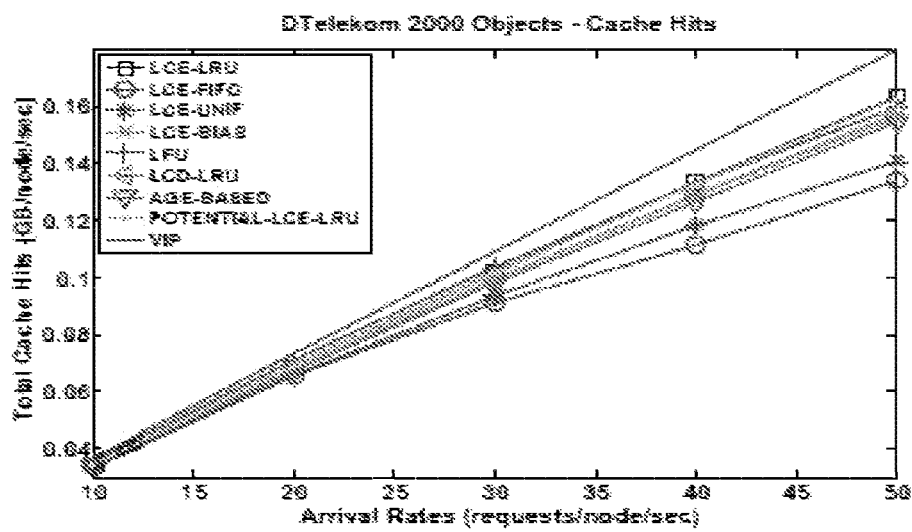
FIG. 22 illustrates a graph of total cache hits vs. request arrival rates for the DTelekom Network generated in the further experimental comparison.

An additional set of experimental evaluations was carried out, in a manner similar to that described above, but using the DTelekom Topology (employing 68 nodes) instead of the Tree topology. In particular, experimental scenarios were carried on four network topologies: the Abilene Topology (9 nodes) (FIG. 2), the GEANT topology (22 nodes) (FIG. 3), the Service Network topology (8 nodes) (FIG. 4), and the DTelekom Topology (68 nodes) (FIG. 14).

In the Service Network and Abilene topologies, all link capacities are chosen to be 500 Mb/s. In the GEANT and DTelekom topologies, all link capacities are chosen to be 200 Mb/s. The Interest Packet size is 125 B; the Data Packet size is 50 KB; the data object size is 5 MB. At each node requesting data, object requests arrive according to a Poisson process with an overall rate λ (in requests/node/sec). Each arriving request requests data object k (independently) with probability $p_k$, where $\{p_k\}$ follows a (normalized) Zipf distribution with parameter 0.75. In the GEANT and DTelekom topologies, a total of 2000 data objects are considered, while in the other topologies (Service Network and Abilene), 5000 data objects are considered. The buffers which hold the Interest and Data Packets at each node are assumed to have infinite size. PIT expiration timers and interest retransmissions are not considered.

In the Abilene, GEANT, and DTelekom topologies, object requests can be generated by any node, and the content source for each data object is independently and uniformly distributed among all nodes. The cache sizes at all nodes are identical, and are chosen to be 5 GB (1000 data objects) in the Abilene topology and 2 GB (400 data objects) in the GEANT and DTelekom topologies. In the Service Network topology, NODE 1 is the content source for all objects and requests can be generated only by the CONSUMER nodes. The cache sizes at NODE 2, NODE 3, NODE 4 and the CONSUMER nodes are 5 GB.

In the virtual plane, the slot length is 200 msec in the GEANT and DTelekom topologies and 80 msec in the other topologies. Forwarding uses the backpressure algorithm with a cost bias to help direct VIPs toward content sources. (It can be shown that the cost-biased version is also throughput optimal in the virtual plane, as in Theorem 2.) The cost bias is calculated as the number of hops on the shortest path to the content source, and is added to the VIP queue differential. In the actual plane, the time step for forwarding and caching decisions is 5 μsec in the GEANT and DTelekom topologies and 2 μsec in the other topologies, i.e., the transmission time of one Interest Packet. The window size T is 5000 slots. Each simulation generates requests for 100 sec and terminates when all Interest Packets are fulfilled. Each curve in FIGS. 15-22 is obtained by averaging over 10 simulation runs.

Simulation experiments were carried out to compare the Stable Caching VIP Algorithm against a number of popular caching algorithms used in conjunction with shortest path forwarding and a potential-based forwarding algorithm. In shortest path forwarding, at any given node, an Interest Packet for data object k is forwarded on the shortest path to the content source for object k. (It is assumed that all chunks of a data object are cached together.) The Data Packet corresponding to the Interest Packet may be retrieved from a caching node along the shortest path. In potential-based forwarding, a potential value for each data object at each node is set as in Eum et al. (S. Eum, K. Nakauchi, M. Murata, Y. Shoji, and N. Nishinaga. Catt: Potential based routing with content caching for icn. In *Proceedings of SIGCOMM* 2012 *ICN*, pages 49-54, Helsinki, Finland, August 2012.) At each time and for each node, an Interest Packet for object k is forwarded to the neighbor with the lowest current potential value for object k.

Each caching algorithm comprises two parts: caching decision and caching replacement. Caching decision decides whether or not to cache a new data object when the first chunk of this object arrives and there is no remaining cache space. If a node decides to cache the new data object, then caching replacement decides which currently cached data object should be evicted to make room for the new data object. The following caching decision policies are considered: (i) Leave Copies Everywhere (LCE), which decides to cache all new data objects, and (ii) Leave a Copy Down (LCD), where upon a cache hit for data object k at node n, object k is cached at the node which is one hop closer to the requesting node (while object k remains cached at node n). The following caching replacement policies are considered: (i) Least Recently Used (LRU), which replaces the least recently requested data object, (ii) First In First Out (FIFO), which replaces the data object which arrived first to the cache; (iii) UNIF, which chooses a currently cached data object for replacement, uniformly at random, and (iv) BIAS, which chooses two currently cached data objects uniformly at random, and then replaces the less frequently requested one. In addition, Least Frequently Used (LFU) and age-based caching are considered. In LFU, the nodes record how often each data object has been requested and choose to cache the new data object if it is more frequently requested than the least frequently requested cached data object (which is replaced). In age-based caching, each cached object k at node n is assigned an age which depends on $p_k$, the (Zipf) popularity of object k, and the shortest-path distance between n and src(k). The cache replacement policy replaces the cached object for which the age has been exhausted the longest.

Considered are LCE-LRU, LCE-FIFO, LCE-UNIF, and LCE-BIAS combined with shortest path forwarding. Also considered are (under shortest path forwarding) LCD combined with LRU, as well as LCE-LRU combined with potential-based forwarding.

The delay for an Interest Packet request is the difference between the fulfillment time (i.e., time of arrival of the requested Data Packet) and the creation time of the Interest Packet request. A cache hit for a data chunk is recorded when an Interest Packet reaches a node which is not a content source but which has the data chunk in its cache. When a cache hit occurs, the corresponding metric is incremented by the size of the chunk in cache.

FIGS. 15-18 show the delay performance of the algorithms. It is clear that the Stable Caching VIP Algorithm significantly outperforms all other algorithms tested. For instance, for the Abilene topology at Λ=100 requests/node/sec, the total delay for the VIP algorithm is only 55% of the delay for the closest competitor (LCE-LRU), and only about 36% of the delay for the worst performing algorithm (LCE-FIFO). FIGS. 19-22 show the cache hit performance for the algorithms. Again, the Stable Caching VIP Algorithm has significantly higher total cache hits than other algorithms. For the Service topology at λ=200 requests/node/sec, the total number of cache hits for Algorithm 3 is about 10% higher than that for the closest competitor (LCD-LRU) and is more than two times the number of cache hits for the worst performing algorithm (LCE-FIFO).

In sum, the Stable Caching VIP Algorithm significantly outperforms all competing algorithms tested, in terms of user delay and rate of cache hits.

Numerical experiments for the congestion control algorithm were carried out on the Abilene topology. Link capacities are chosen to be 100 Mb/s and cache sizes are chosen as 1 GB (200 data objects) per node. The Interest Packet size is 125B; the Data Packet size is 50 KB; the data object size is 5 MB. At each node, requests arrive according to a Poisson process with an overall rate of 100 (in requests/sec/node). Each arriving request requests data object k (independently) with probability $p_k$. Where $\{p_k\}$ follows a (normalized) Zipf distribution with parameter 0.75. When a request arrives at a node, it first goes into the corresponding transport-layer queue for the requested content, waiting to be admitted into the network layer. Each simulation generates requests and admits requests into the network layer, for 100 see, and terminates when all the admitted requests are fulfilled. Each simulation result curve is averaged over 10 runs.

In the virtual plane, the length of a slot is chosen as 400 msec. In each slot, the congestion control algorithm is run before the network layer VIP algorithm is run. The congestion control algorithm updates the transport layer VIP queues, virtual VIP queues and the network layer VIP queues of all data objects at all nodes in each slot, within the virtual plane. Once admitted into the network layer, a request for an object k will generate corresponding Interest Packets for different chunks of the requested object. Forwarding and caching then proceeds according to the VIP algorithm in the network layer.

We use α-fairness utility functions with different $\alpha \in (0; \infty)$ values in these experiments to decide the admission rates into the network layer. The α-fairness utility function is given by:

$$U(x) = \begin{cases} \frac{x^{1-\alpha}}{1-\alpha}, & \alpha > 0, \alpha \neq 1 \\ \log x, & \alpha = 1 \end{cases}$$

Figure 23:
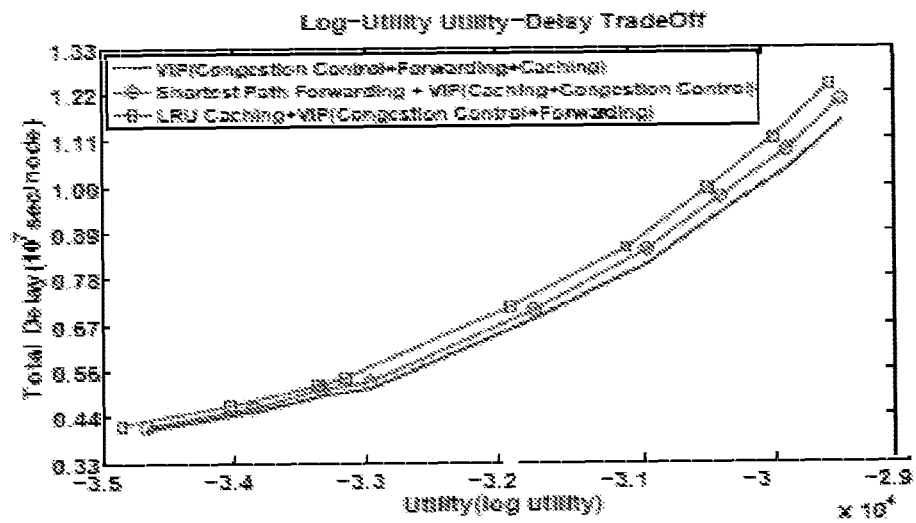
FIG. 23 illustrates α-fairness Utility with α=0 Utility-Delay tradeoff.
Figure 24:
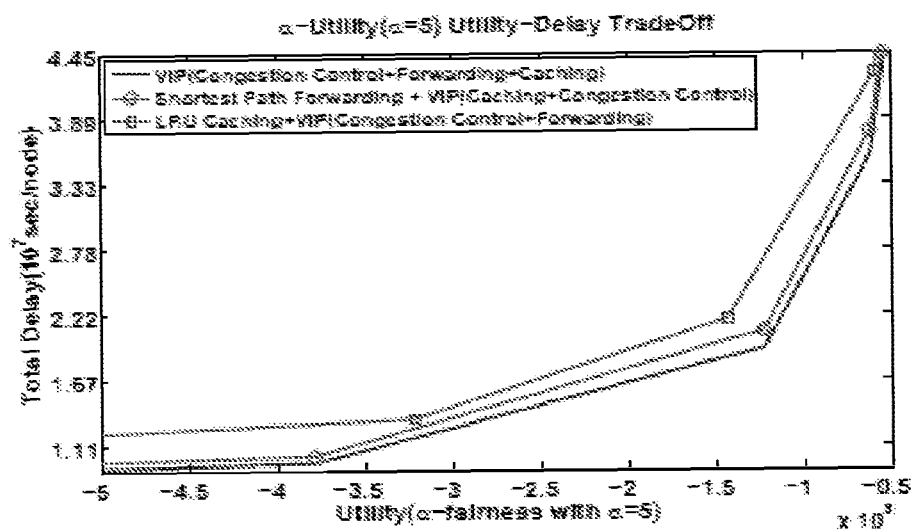
FIG. 24 illustrates α-fairness Utility with α=5 Utility-Delay tradeoff.

When α equals 1, proportional fairness is achieved. With a large a value, max-min fairness is approximated. The delay of each request is measured by the sum of all time slots between the time the Interest Packet is generated and the time the corresponding Data Packet is returned to this node. The maximum admission rate of the congestion control algorithm is set to be 10 requests in each time slot in the virtual plane. We set different W parameters to control the admission rates and obtain different tradeoffs between the achieved utility and delay. Experiments were carried to compare the performance (represented by utility-delay trade-off lines) of 1) VIP congestion control+VIP caching+ VIP forwarding algorithm, 2) VIP congestion control+VIP caching+shortest path forwarding algorithm, and 3) VIP congestion control+VIP caching+LRU caching algorithm. In the obtained results, we can see that at the same utility level, the first complete VIP combination attains the lowest delay. FIG. 23 illustrates α-fairness Utility with α=0 Utility-Delay tradeoff. FIG. 24 illustrates α-fairness Utility with α=5 Utility-Delay tradeoff.

The general VIP framework allows for a large class of control and optimization algorithms operating on VIPs in the virtual plane, as well as a large class of mappings from the virtual plane to specify forwarding and caching in the actual plane. Thus, the VIP framework represents an adaptable paradigm for designing efficient NDN-based networks with different properties and trade-offs.

It will be appreciated that the general VIP framework described herein can be implemented in a wide variety of networks or architectures. For example, and without limitation, the network can comprise a named data network, a content-centric network, an information centric network, a content distribution network, a data center, a cloud computing architecture, or a peer to peer network. The term "network" as used herein encompasses all such networks or architectures.

Proof of Theorem 1

The proof of Theorem 1 involves showing that $\Lambda \in \Lambda$ is necessary for stability and that $\lambda \in \text{int}(\Lambda)$ is sufficient for stability. First, it is shown that $\lambda \in \Lambda$ is necessary for stability. Suppose the network under arrival rate A is stabilizable by some feasible forwarding and caching policy. Let $F_{ab}^k(t)$ denote the number of VIPs for object k transmitted over link (a,b) during slot t, satisfying $$F_{ab}^k(t) \geq 0, \quad (31)$$

$$F_{nn}^k(t) = 0,$$

$$F_{src(k)n}^k(t) = 0,$$

$$\forall a, b, n \in \mathcal{N}, k \in \mathcal{K}$$

$$F_{ab}^k(t) = 0, \quad (32)$$

$$\forall a, b \in \mathcal{N}, k \in \mathcal{K}, (a, b) \notin \mathcal{L}^k$$

$$\sum_{k \in \mathcal{K}} F_{ab}^k(t) \leq C_{ba}/z, \forall (a, b) \in \mathcal{L} \quad (33)$$

For any slot t, we can define:

$$f_{ab}^k = \sum_{\tau=1}^{\tilde{t}} F_{ab}^k(\tau)/\tilde{t}.$$

Thus, by Equations (31), (32), and (33), Equations (8), (9), and (12) can be proven separately. Let $s_n^k(t)$ denote the caching state of object k at node n during slot t, which satisfies $$s_n^k(t) \in \{0,1\}, \forall n \in \mathcal{N}, k \in \mathcal{K} \quad (34)$$

Define (noting that $\mathcal{T}_{n,i,l} \cap \mathcal{T}_{n,j,m} = \emptyset$ for all $(i,l) \neq (j,m)$ for $n \in \mathcal{N}$)

$$T_{n,i,l} = \{\tau \in \{1, \ldots, \tilde{t}\}: s_n^k(\tau) = 1 \forall k \in \mathcal{B}_{n,i,l}, s_n^k(\tau) = 0 \forall k \notin \mathcal{B}_{n,i,l}\}$$

for $i=1, \ldots, \binom{n}{i_n}$, and $l=0, \ldots, i_n$. Define $\beta_{n,i,l} = T_{n,i,l}/\tilde{t}$ where $T_{n,i,l} = |\mathcal{T}_{n,i,l}|$. Thus, we can prove Equations (10) and (13). It remains to prove Equation (12). By Lemma 1 of M. J. Neely, E. Modiano, and C. E. Rohrs; Dynamic power allocation and routing for time varying wireless networks; *IEEE J. Sel. Areas Commun.*, 23(1):89-103, January 2005; network stability implies there exists a finite M such that $V_n^k(t) \leq M$ for all $n \in \mathcal{N}$ and $k \in \mathcal{K}$ holds infinitely often. Given an arbitrarily small value $\epsilon > 0$, there exists a slot $\tilde{t}$ such that $$V_n^k(\tilde{t}) \leq M, \frac{M}{\tilde{t}} \leq \epsilon, \left| \frac{\sum_{\tau=1}^{\tilde{t}} A_n^k(\tau)}{\tilde{t}} - \lambda_n^k \right| \leq \epsilon \quad (35)$$

In addition, since or a slot t, the queue length is equal to the difference between the total VIPs that have arrived and departed as well as drained, assuming $V_n^k(1)=0$, then:

$$\sum_{\tau=1}^{\tilde{t}} A_n^k(\tau) - V_n^k(t) \leq \sum_{\tau=1}^{t} \sum_{b \in \mathcal{N}} F_{nb}^k(\tau) - \sum_{\tau=1}^{\tilde{t}} \sum_{a \in \mathcal{N}} F_{an}^k(\tau) + r_n \sum_{\tau=1}^{t} s_n^k(\tau) \quad (36)$$

Thus, by Equations (35) and (36):

$$\lambda_n^k - \epsilon \leq \frac{1}{\tilde{t}} \sum_{\tau=1}^{\tilde{t}} A_n^k(\tau) \leq \quad (37)$$

$$\frac{1}{\tilde{t}} V_n^k(\tilde{t}) + \frac{1}{\tilde{t}} \sum_{\tau=1}^{\tilde{t}} \sum_{b \in \mathcal{N}} F_{nb}^k(\tau) - \frac{1}{\tilde{t}} \sum_{\tau=1}^{\tilde{t}} \sum_{a \in \mathcal{N}} F_{an}^k(\tau) + r_n \frac{1}{\tilde{t}} \sum_{\tau=1}^{\tilde{t}} s_n^k(\tau)$$

Since $\sum_{\tau=1}^{t} s_n^k(\tau) = \sum_{l=0}^{i_n} \sum_{i=1}^{\binom{K}{l}} T_{n,i,l} 1[k \in \mathcal{B}_{n,i,l}]$.

then, by Equation (37):

$$\lambda_n^k \leq \sum_{b \in \mathcal{N}} f_{nb}^k - \sum_{a \in \mathcal{N}} f_{an}^k + r_n \sum_{l=0}^{i_n} \sum_{i=1}^{\binom{K}{l}} \beta_{n,i,l} 1[k \in \mathcal{B}_{n,i,l}] + 2\epsilon.$$

By letting $\epsilon \to 0$, Equation (12) can be proven.

Next, it is shown that $\lambda \in \text{int}(\Lambda)$ is sufficient for stability. $\lambda \in \text{int}(\Lambda)$ implies that there exists $\epsilon = (\epsilon_n^k)$, where $\epsilon_n^k > 0$, such that $\lambda + \epsilon \in \Lambda$. Let $(f_{ab}^k)$ and $(\beta_n)$ denote the flow variables and storage variables associated with arrival rates $\lambda + \epsilon$. Thus, Equations (8), (9), (10), (12), (13), and $$\lambda_n^k + \epsilon_n^k \leq \sum_{b \in \mathcal{N}} f_{nb}^k - \sum_{a \in \mathcal{N}} f_{an}^k + r_n \sum_{l=0}^{i_n} \sum_{i=1}^{\binom{K}{l}} \beta_{n,i,l} 1[k \in \mathcal{B}_{n,i,l}], \quad (38)$$

$$\forall n \in \mathcal{N}, k \in \mathcal{K}, n \neq src(k)$$

hold. The randomized forwarding policy can now be constructed. For every link (a,b) such that
$\Sigma_{k \in \mathcal{K}} f_{ab}^k > 0$.
transmit the VIPs of the single object $\bar{k}_{ab}$, where $\bar{k}_{ab}$ is chosen randomly to be k with probability
$f_{ab}^k / \Sigma_{k \in \mathcal{K}} f_{ab}^k$.
Then, the number of VIPs that can be transmitted in slot t is as follows:

$$\tilde{\mu}_{ab}^k(t) = \begin{cases} \sum_{k \in \mathcal{K}} f_{ab}^k, & \text{if } k = \bar{k}_{ab} \\ 0, & \text{otherwise} \end{cases} \quad (39)$$

Null bits are delivered if there are not enough bits in a queue. For every link (a,b) such that
$\Sigma_{k \in \mathcal{K}} f_{ab}^k = 0$, choose $\tilde{\mu}_{ab}^k(t) = 0$ for all $k \in \mathcal{K}$. Thus:

$\mathbb{E}[\tilde{\mu}_{ab}^k(t)] = f_{ab}^k \quad (40)$

Next, the randomized caching policy is constructed. For every node n, cache the single combination $\tilde{\beta}_n$, where $\tilde{\beta}_n$ is chosen randomly to be $\beta_{n,i,l}$ with probability $$\beta_{n,i,l} \Big/ \sum_{l=0}^{i_n} \sum_{i=1}^{\binom{K}{l}} \beta_{n,i,l} = \beta_{n,i,l}, \text{ as}$$

$$\sum_{l=0}^{i_n} \sum_{i=1}^{\binom{K}{l}} \beta_{n,i,l} = 1$$

by Equation (13). Then, the caching state in slot t is as follows:

$$\tilde{s}_n^k(t) = \begin{cases} 1, & \text{if } k \in \tilde{\mathcal{B}}_n \\ 0, & \text{otherwise} \end{cases} \quad (41)$$

$$\text{Thus: } \mathbb{E}[\tilde{s}_n^k(t)] = \sum_{l=0}^{i_n} \sum_{i=1}^{\binom{K}{l}} \beta_{n,i,l} 1[k \in \mathcal{B}_{n,i,l}] \quad (42)$$

Therefore, by Equations (40), (42) and (38):

$$\mathbb{E}\left[\left(\sum_{b \in \mathcal{N}} \tilde{\mu}_{nb}^k(t) - \sum_{a \in \mathcal{N}} \tilde{\mu}_{an}^k(t) + r_n^{(k)} \tilde{s}_n^k(t)\right)\right] = \quad (43)$$

$$\sum_{b \in \mathcal{N}} f_{nb}^k - \sum_{a \in \mathcal{N}} f_{an}^k + r_n \sum_{l=0}^{i_n} \sum_{i=1}^{\binom{K}{l}} \mathcal{B}_{n,i,l} 1[k \in \mathcal{B}_{n,i,l}] \geq \lambda_n^k + \epsilon_n^k$$

In other words, the arrival rate is less than the service rate. Thus, by Loynes' theorem (R. M. Loynes; The stability of a queue with non-independent interarrival and service times; *Mathematical Proceedings of the Cambridge Philosophical Society*, volume 58, pages 497-520, 1962), it can be shown that the network is stable.

Proof of Theorem 2

Define the quadratic Lyapunov function $$\mathcal{L}(V) \triangleq \sum_{n \in \mathcal{N}, k \in \mathcal{K}} (V_n^k)^2.$$

The Lyapunov drift at slot t is given by $\Delta(V(t)) \triangleq \mathbb{E}[\mathcal{L}C(V(t+1)) - \mathcal{L}(V(t))|V(t)]$. First, calculate $\Delta(V(t))$. Taking square on both sides of Equation (1):

$$(V_n^k(t+1))^2 \leq \left(\left(\left(V_n^k(t) - \sum_{b \in \mathcal{N}} \mu_{nb}^k(t)\right)^+ + A_n^k(t) + \sum_{a \in \mathcal{N}} \mu_{an}^k(t) - r_n s_n^k(t)\right)^+\right)^2 \leq$$

$$\left(\left(V_n^k(t) - \sum_{b \in \mathcal{N}} \mu_{nb}^k(t)\right)^+ + A_n^k(t) + \sum_{a \in \mathcal{N}} \mu_{an}^k(t) - r_n s_n^k(t)\right)^2 \leq$$

$$\left(V_n^k(t) - \sum_{b \in \mathcal{N}} \mu_{nb}^k(t)\right)^2 + 2\left(V_n^k(t) - \sum_{b \in \mathcal{N}} \mu_{nb}^k(t)\right)^+ \times$$

$$\left(A_n^k(t) + \sum_{a \in \mathcal{N}} \mu_{an}^k(t) - r_n s_n^k(t)\right) + \left(A_n^k(t) + \sum_{a \in \mathcal{N}} \mu_{an}^k(t) - r_n s_n^k(t)\right)^2$$

$$= (V_n^k(t))^2 + \left(\sum_{b \in \mathcal{N}} \mu_{nb}^k(t)\right)^2 - 2V_n^k(t) \sum_{b \in \mathcal{N}} \mu_{nb}^k(t) +$$

$$\left(A_n^k(t) + \sum_{a \in \mathcal{N}} \mu_{an}^k(t) - r_n s_n^k(t)\right)^2 +$$

$$2\left(V_n^k(t) - \sum_{b \in \mathcal{N}} \mu_{nb}^k(t)\right)^+ \left(A_n^k(t) + \sum_{a \in \mathcal{N}} \mu_{an}^k(t)\right) -$$

$$2\left(V_n^k(t) - \sum_{b \in \mathcal{N}} \mu_{nb}^k(t)\right)^+ r_n s_n^k(t) \leq (V_n^k(t))^2 + \left(\sum_{b \in \mathcal{N}} \mu_{nb}^k(t)\right)^2 -$$

$$2V_n^k(t) \sum_{b \in \mathcal{N}} \mu_{nb}^k(t) + \left(A_n^k(t) + \sum_{a \in \mathcal{N}} \mu_{an}^k(t) + r_n^k s_n^k(t)\right)^2 +$$

$$2V_n^k(t)\left(A_n^k(t) + \sum_{a \in \mathcal{N}} \mu_{an}^k(t)\right) - 2\left(V_n^k(t) - \sum_{b \in \mathcal{N}} \mu_{nb}^k(t)\right)^+ r_n^k s_n^k(t) \leq$$

-continued $$(V_n^k(t))^2 + \left(\sum_{b\in N}\mu_{nb}^k(t)\right)^2 + 2\sum_{b\in N}\mu_{nb}^k(t)r_n s_n^k(t) +$$

$$\left(A_n^k(t) + \sum_{a\in N}\mu_{an}^k(t) + r_n s_n^k(t)\right)^2 + 2V_n^k(t)A_n^k(t) -$$

$$2V_n^k(t)\left(\sum_{b\in N}\mu_{nb}^k(t) - \sum_{a\in N}\mu_{an}^k(t)\right) - 2V_n^k(t)r_n s_n^k(t)$$

Summing over all n, k:

$$\mathcal{L}(V(t+1)) - \mathcal{L}(V(t)) \overset{(a)}{\leq} 2NB + 2\sum_{n\in N, b\in \mathcal{K}} V_n^k(t)A_n^k(t) - \quad (44)$$

$$2\sum_{(a,b)\in \mathcal{L}}\sum_{k\in \mathcal{K}} \mu_{ab}^k(t)(V_a^k(t) - V_b^k(t)) - 2\sum_{n\in N, b\in \mathcal{K}} V_n^k(t)r_n s_n^k(t)$$

where (a) is due to the following:

$$\sum_{k\in \mathcal{K}}\left(\sum_{b\in N}\mu_{nb}^k(t)\right)^2 \leq \left(\sum_{k\in \mathcal{K}}\sum_{b\in N}\mu_{nb}^k(t)\right)^2 \leq (\mu_{n,max}^{out})^2,$$

$$\sum_{k\in \mathcal{K}}\left(A_n^k(t) + \sum_{a\in N}\mu_{an}^k(t) + r_n s_n^k(t)\right)^2 \leq$$

$$\left(\sum_{k\in \mathcal{K}}\left(A_n^k(t) + \sum_{a\in N}\mu_{an}^k(t) + r_n s_n^k(t)\right)\right)^2 \leq (A_{n,max} + \mu_{n,max}^k + r_{n,max})^2,$$

$$\sum_{k\in \mathcal{K}}\sum_{b\in N}\mu_{nb}^k(t)r_n s_n^k(t) \leq \left(\sum_{k\in \mathcal{K}}\sum_{b\in N}\mu_{nb}^k(t)\right)\left(\sum_{k\in \mathcal{K}}r_n s_n^k(t)\right) \leq \mu_{n,max}^{out}r_{n,max},$$

$$\sum_{n\in N, k\in \mathcal{K}} V_n^k(t)\left(\sum_{b\in N}\mu_{nb}^k(t) - \sum_{a\in N}\mu_{an}^k(t)\right) = \sum_{(a,b)\in \mathcal{L}}\sum_{k\in \mathcal{K}}\mu_{ab}^k(t)(V_a^k(t) - V_b^k(t)).$$

Taking conditional expectations on both sides of Equation (44):

$$\Delta(V(t)) \leq 2NB + 2\sum_{n\in N, k\in \mathcal{K}} V_n^k(t)\lambda_n^k - \quad (45)$$

$$2\mathbb{E}\left[\sum_{(a,b)\in \mathcal{L}}\sum_{k\in \mathcal{K}}\mu_{ab}^k(t)(V_a^k(t) - V_b^{(c)}(t)) \mid V(t)\right] -$$

$$2\mathbb{E}\left[\sum_{n\in N, k\in \mathcal{K}} V_n^k(t)r_n s_n^k(t) \mid V(t)\right] \overset{(b)}{\leq} 2NB + 2\sum_{n\in N, k\in \mathcal{K}} V_n^k(t)\lambda_n^k -$$

$$2\mathbb{E}\left[\sum_{(a,b)\in \mathcal{L}}\sum_{k\in \mathcal{K}}\tilde{\mu}_{ab}^k(t)(V_a^k(t) - V_b^k(t)) \mid V(t)\right] -$$

$$2\mathbb{E}\left[\sum_{(a,b)\in \mathcal{L}}\sum_{k\in \mathcal{K}} V_n^k(t)r_n \tilde{s}_n^k(t) \mid V(t)\right] = 2NB + 2\sum_{n\in N, k\in \mathcal{K}} V_n^k(t)\lambda_n^k -$$

$$2\sum_{n\in N, k\in \mathcal{K}} V_n^k(t) \times \mathbb{E}\left[\left(\sum_{b\in N}\tilde{\mu}_{nb}^k(t) - \sum_{a\in N}\tilde{\mu}_{an}^k(t) + r_n \tilde{s}_n^k(t)\right) \mid V(t)\right]$$

where (b) is due to the fact that Algorithm 1 minimizes the R.H.S. of (b) over all feasible $\bar{\mu}_{ab}^k(t)$ and $\bar{s}_n^k(t)$. (Note that $\mu_{ab}^k(t)$ and $s_n^k(t)$ denote the actions of Algorithm 1.) Since $\lambda + \epsilon \in \Lambda$, according to the proof of Theorem 1, there exists a stationary randomized forwarding and caching policy that makes decisions independent of V(t) such that $$\mathbb{E}\left[\left(\sum_{b\in N}\tilde{\mu}_{nb}^k(t) - \sum_{a\in N}\tilde{\mu}_{an}^k(t) + r_n \tilde{s}_n^k(t)\right) \mid V(t)\right] \geq \lambda_n^k + \epsilon_n^k \quad (46)$$

Substituting Equation (46) into Equation (45):

$$\Delta(V(t)) \leq 2NB - 2\Sigma_{n\in \mathcal{N}, k\in \mathcal{K}} \epsilon_n^k V_n^k(t) \leq 2NB - 2\epsilon \Sigma_{n\in \mathcal{N}, k\in \mathcal{K}} V_n^k(t)$$

The proof is completed by Lemma 4.1 of Georgiadis et al. (L. Georgiadis, M. J. Neely, and L. Tassiulas; Resource allocation and cross-layer control in wireless networks; *Foundations and Trends in Networking*, 1(1)1:1-144, 2006.)

Proof of Theorem 3

Define the Lyapunov function $$\mathcal{L}(\Theta) \triangleq \sum_{n\in N, k\in \mathcal{K}}\left((V_n^k)^2 + (Y_n^k)^2\right)$$

where $\Theta \triangleq (V,Y)$. The Lyapunov drift at slot t is y $\Delta(\Theta(t)) \triangleq \mathbb{E}[\mathcal{L}(\Theta(t+1)) - \mathcal{L}(\Theta(t)) \mid \Theta(t)]$. First, calculate $\Delta(\Theta(t))$. Taking square on both sides of Equation (1):

$$(V_n^k(t+1))^2 \leq (V_n^k(t))^2 + \left(\sum_{b\in N}\mu_{nb}^k(t)\right)^2 + \quad (47)$$

$$2\sum_{b\in N}\mu_{nb}^k(t)r_n s_n^k(t) + \left(\alpha_n^k(t) + \sum_{a\in N}\mu_{an}^k(t) + r_n s_n^k(t)\right)^2 +$$

$$2V_n^k(t)\alpha_n^k(t) - 2V_n^k(t)\left(\sum_{b\in N}\mu_{nb}^k(t) - \sum_{a\in N}\mu_{an}^k(t)\right) - 2V_n^k(t)r_n s_n^k(t)$$

In addition, taking square on both side of Equation (25):

$$(Y_n^k(t+1))^2 \leq (Y_n^k(t))^2 + (\alpha_n^k(t))^2 + (\gamma_n^k(t))^2 - 2Y_n^k(t)(\alpha_n^k(t) - \gamma_n^k(t)) \quad (48)$$

Therefore, $$\mathcal{L}(\Theta(t+1)) - \mathcal{L}(\Theta(t)) \leq 2N\hat{B} + 2\sum_{n\in N, k\in \mathcal{K}} V_n^k(t)\alpha_n^k(t) -$$

$$2\sum_{n\in N, k\in \mathcal{K}} V_n^k(t)\left(\sum_{b\in N}\mu_{nb}^k(t) - \sum_{a\in N}\mu_{an}^k(t)\right) -$$

$$2\sum_{n\in N, k\in \mathcal{K}} V_n^k(t)r_n s_n^k(t) - 2\sum_{n\in N, k\in \mathcal{K}} Y_n^k(t)(\alpha_n^k(t) - \gamma_n^k(t))$$

Taking conditional expectations and subtracting $$W\mathbb{E}\left[\sum_{n\in N, k\in \mathcal{K}} g_n^k(\gamma_n^k(t)) \mid \Theta(t)\right]$$

from both sides of Equation (48), $$\Delta(\Theta(t)) - W\mathbb{E}\left[\sum_{n\in N, k\in \mathcal{K}} g_n^k(\gamma_n^k(t)) \mid \Theta(t)\right] \overset{(2)}{\leq} \quad (49)$$

$$2N\hat{B} - 2\sum_{n\in N, k\in \mathcal{K}} (Y_n^k(t) - V_n^k(t))\mathbb{E}[\tilde{\alpha}_n^k(t) \mid \Theta(t)] -$$

$$\sum_{n\in N, k\in \mathcal{K}} \mathbb{E}[Wg_n^k(\tilde{\gamma}_n^k(t)) - 2Y_n^k(t)\tilde{\gamma}(t) \mid \Theta(t)] - 2\sum_{n\in N, k\in \mathcal{K}} V_n^k(t) -$$

-continued
$$2\sum_{n\in N, k\in \mathcal{K}} V_n^k(t) \times \mathbb{E}\left[\left(\sum_{b\in N}\tilde{\mu}_{nb}^k(t) - \sum_{a\in N}\tilde{\mu}_{an}^k(t) + r_n\tilde{s}_n^k(t)\right)\bigg|\Theta(t)\right]$$

where (a) is due to the fact that Algorithm 2 minimizes the R.II.S. of (b) over all possible alternative $\tilde{\alpha}_n^k(t)$, $\tilde{\gamma}_n^k(t)$, $\tilde{\mu}_n^k(t)$, and $\tilde{s}_n^k(t)$. (Note that $\tilde{\alpha}_n^k(t)$, $\tilde{\gamma}_n^k(t)$, $\tilde{\mu}_n^k(t)$, and $\tilde{s}_n^k(t)$ denote the actions of Algorithm 2.) It is not difficult to construct alternative random policies that choose $\tilde{\alpha}_n^k(t)$, $\tilde{\gamma}_n^k(t)$, $\tilde{\mu}_n^k(t)$, and $\tilde{s}_n^k(t)$, such that $$\mathbb{E}[\tilde{\alpha}_n^k(t)|\Theta(t)] = \overline{\alpha}_n^{k*}(\epsilon) \quad (50)$$

$$\tilde{\gamma}_n^k(t) = \overline{\alpha}_n^{k*}(\epsilon) \quad (51)$$

$$\mathbb{E}\left[\left(\sum_{b\in N}\tilde{\mu}_{nb}^k(t) - \sum_{a\in N}\tilde{\mu}_{an}^k(t) + \tau_n\tilde{s}_n^k(t)\right)\bigg|\Theta(t)\right] \geq \overline{\alpha}_n^{k*}(\epsilon) + \epsilon_n^k \quad (52)$$

where $\overline{\alpha}^*(\epsilon) = (\overline{\alpha}_n^{k*}(\epsilon))$ is the target ε-optimal admitted rate given by Equation 21. (Specifically, Equation (50) can be achieved by the random policy setting $\overline{\alpha}_n^k(t) = A_n^k(t)$ with probability $\overline{\alpha}^*(\epsilon)/\lambda_n^k$ and $\overline{\alpha}_n^k(t)=0$ with probability $1-\overline{\alpha}_n^{k*}(\epsilon)/\lambda_n^k$.) Equation (52) follows from the same arguments leading to Equation (47). Thus, by Equations (50), (51), and (52), from Equation (49), the following is obtained:

$$\Delta(\Theta(t)) - W\mathbb{E}\left[\sum_{n\in N,k\in\mathcal{K}} g_n^k(\gamma_n^k(t))\bigg|\Theta(t)\right] \leq$$
$$2N\hat{B} - 2\min_{n\in N, k\in\mathcal{K}}\{\epsilon_n^k\}\sum_{n\in N,k\in\mathcal{K}} V_n^k(t) - W\sum_{n\in N,k\in\mathcal{K}} g_n^k(\overline{\alpha}_n^{k*}(\epsilon))$$

Applying Theorem 5.4 of Georgiadis et al. (L. Georgiadis, M. J. Neely, and L. Tassiulas; Resource allocation and cross-layer control in wireless networks; *Foundations and Trends in Networking*, 1(1)1:1-144, 2006.):

$$\limsup_{t\to\infty}\frac{1}{t}\sum_{\tau=1}^t\sum_{n\in N,k\in\mathcal{K}}\mathbb{E}[V_n^k(\tau)] \leq \frac{2N\hat{B}+WG_{max}}{2\min_{n\in N,k\in\mathcal{K}}\{\epsilon_n^k\}} \quad (53)$$

$$\liminf_{t\to\infty}\sum_{n\in N,k\in\mathcal{K}} g_n^k(\overline{\gamma}_n^k(t)) \geq \sum_{n\in N,k\in\mathcal{K}} g_n^k(\overline{\alpha}_n^{k*}(\epsilon)) - \frac{2N\hat{B}}{W} \quad (54)$$

As in Georgiadis et al., (page 88), the R.H.S. of Equations (53) and (54) are optimized over all possible $\epsilon\in\Lambda$. Thus, Equation (26) and $$\limsup_{t\to\infty}\sum_{n\in N,k\in\mathcal{K}} g_n^k(\overline{\gamma}_n^k(t)) \geq \sum_{n\in N,k\in\mathcal{K}} g_n^k(\overline{\alpha}_n^{k*}(\epsilon)) - \frac{2N\hat{B}}{W} \quad (55)$$

can be shown where $$\overline{\gamma}_n^k(t) \triangleq \frac{1}{t}\sum_{\tau=1}^t \mathbb{E}[\gamma_n^k(\tau)].$$

It is easy to prove
$$\overline{\gamma}_n^k(t) \leq \overline{\alpha}_n^k(t)$$
by showing the stability of the virtual queues. Thus, Equation (27) can be shown based on Equation (55). The proof is complete.

REFERENCES

L. Zhang, D. Estrin, J. Burke, V. Jacobson, J. Thornton, D. K. Smetters, B. Zhang, G. Tsudik, ke claffy, D. Krioukov, D. Massey. C. Papadopoulos, T. Abdelzaher, L. Wang, P. Crowley, and E. Yeh, Named data networking (ndn) project. October 2010.

S. Eum, K. Nakauchi, M. Murata, Y. Shoji, and N. Nishinaga. Catt: Potential based routing with content caching for icn. In *Proceedings of SIGCOMM* 2012 *ICN*, pages 49-54, Helsinki, Finland, August 2012.

M. Amble, P. Parag, S. Shakkottai, and L. Ying. Content-aware caching and traffic management in content distribution networks. In *Proceedings of IEEE INFOCOM* 2011, pages 2858-2866, Shanghai, China, April 2011.

H. Xie, G. Shi, and P. Wang. Tecc: Towards collaborative in-network caching guided by traffic engineering. In *Proceedings of IEEE INFOCOM* 2012:*Mini-Conference*, pages 2546-2550, Orlando, Florida, USA, March 2012.

L. Tassiulas and A. Ephremides. Stability properties of constrained queueing systems and scheduling for maximum throughput in multihop radio networks. *IEEE Trans. Autom. Control*, 37(12):1936-1949, December 1992.

N. Laoutaris, S. Syntila, and I. Stavrakakis. Meta algorithms for hierarchical web caches. In *Performance, Computing, and Communications*, 2004 *IEEE International Conference on*, pages 445-452, 2004.

E. M. Yeh, T. Ho, Y. Cul, M. Hurd, R. Liu, and D. Leong. Vip: A framework for joint dynamic forwarding and caching in named data networks. http://www.ece.neu.eduh.eyehipublications.html/vipicn.pdf. Technical report, 2014.

M. J. Neely, E. Modiano, and C. E. Rohrs. Dynamic power allocation and routing for time varying wireless networks; *IEEE J. Sel. Areas Commun.*, 23(1):89-103, January 2005.

R. M. Loynes. The stability of a queue with non-independent interarrival and service times. *Mathematical Proceedings of the Cambridge Philosophical Society*, volume 58, pages 497-520, 1962.

L. Georgiadis, M. J. Neely, and L. Tassiulas. Resource allocation and cross-layer control in wireless networks. *Foundations and Trends in Networking*, 1(1)1:1-144, 2006.

S. Gitzenis, G. S. Paschos, and L. Tassiulas. Asymptotic laws for content replication and delivery in wireless networks. In *Proceedings of IEEE INFOCOM* 2012, pages 531-539, Orlando, Florida, USA, March 2012.

V. Jacobson, D. K. Smetters, J. D. Thornton, M. F. Plass, N. H. Briggs, and R. L. Braynard. Networking named content. In *Proceedings of the 5th international conference on Emerging networking experiments and technologies*, CoNEXT'09, pages 1-12, New York, NY, USA, 2009. ACM.

W. Chai, D. He, L. Psaras, and G. Pavlou. Cache "less for more" in information-centric networks. In *Proceedings of the* 11*th International IFIP TC 6 Conference on Networking—Volume Part I*, IFIP'12, pages 27-40, Berlin, Heidelberg, 2012. Springer-Verlag.

Z. Ming, M. Xu, and D. Wang. Age-based cooperative caching in information-centric networks. In *Computer*

Communications Workshops (INFOCOM WKSHPS), 2012 IEEE Conference on, pages 268-273, March 2012.

C. Yi, A. Afanasyev, L. Wang, B. Zhang, and L. Zhang. Adaptive forwarding in named data networking. *SIGCOMM Comput. Commun. Rev.*, 42(3):62-67, June 2012.

J. Mo. and J. Walrand, Fair end-to-end window-based congestion control. *IEEE/ACM Trans. Networking*, vol. 8, no. 5, pp. 556-567, October 2000.

It will be appreciated that the various features of the embodiments described herein can be combined in a variety of ways. For example, a feature described in conjunction with one embodiment may be included in another embodiment even if not explicitly described in conjunction with that embodiment.

The VIP framework can be flexibly implemented in various ways. For instance, for a given forwarding algorithm in the virtual plane (not necessary the same as the forwarding algorithm described here), the VIP caching algorithm can still be used to obtain superior delay and cache hit performance, as long as the VIP counts are maintained. Similarly, for a given caching algorithm, the VIP backpressure

What is claimed is:

1. A system for forwarding and caching in a network, comprising:
    a network device comprising:
        one or more ports configured to receive and transmit requests for data objects in a form of interest packets and to receive and transmit data objects in the form of data packets;
        non-transitory computer readable memory encoded with executable instructions, and transitory computer readable cache memory; and
        a processor operable to execute the instructions in the non-transitory computer readable memory to, in a virtual plane:
            receive at a node a virtual interest packet (VIP) associated with each request for a data object, each VIP comprising an identification of a data object, the node having a network layer and a transport layer;
            maintain a VIP count for each requested data object, the VIP count representing a number of VIPs associated with each requested data object at the node, the VIP count variable over time with demand for each requested data object;
            transmit the VIP count associated with each requested data object to one or more linked neighbor nodes, and receive an incoming VIP count associated with each requested data object from the one or more linked neighbor nodes; and
            transmit each VIP to the one or more linked neighbor nodes at an outgoing transmission rate; and
    in an actual plane:
            forward interest packets for at least a portion of the requested data objects to at least one of the one or more linked neighbor nodes based on the VIP counts;
            store data packets for at least another portion of the requested data objects in transitory cache memory at the node based on the VIP counts;
            store a newly arriving request for a data object in a transitory cache of the transport layer and maintain a corresponding VIP count at the transport layer; and
            admit the newly arriving request for the data object and associated VIPs from the transport layer onto the network layer based on a fairness function among different request-specific data objects.

2. The system of claim 1, wherein the network device comprises a router or a node on the network.

3. The system of claim 1, wherein the network device is configured to maintain a separate VIP queue for each data object, the VIP queue having a size equivalent to the VIP count for an associated data object.

4. The system of claim 1, wherein the network device is configured to update the VIP count associated with each requested data object over a time slot.

5. The system of claim 4, wherein, to update the VIP count, the network device is further configured to:
    subtract an outgoing VIP transmission rate summed over neighbor nodes over the time slot from the VIP count at a beginning of the time slot;
    add a number of incoming exogenous requests for the requested data object received during the time slot;
    add an incoming VIP transmission rate summed over neighbor nodes received during the time slot; and
    if a data object is cached at the node at that time slot, subtract a maximum rate in data objects per time slot at which copies of a data packet can be produced from transitory cache memory at the node.

6. The system of claim 1, wherein the network device is configured to increment the VIP count by 1 for each requested data object.

7. The system of claim 1, wherein the network device is configured to reduce the VIP count for a requested data object by a maximum rate at the node in an event a requested data object is stored in transitory cache memory, the maximum rate including a maximum rate in data objects per time slot at which copies of a data packet can be produced from transitory cache memory at the node.

8. The system of claim 7, wherein the data packet includes a data name, data content, and signature data.

9. The system of claim 1, wherein the computer network include a named data network, a content-centric network, an information centric network, a content distribution network, a data center, a cloud computing architecture, or a peer-to-peer network.

* * * * *